US011119239B2

(12) United States Patent
Kouchmeshky et al.

(10) Patent No.: US 11,119,239 B2
(45) Date of Patent: Sep. 14, 2021

(54) MEASURING PETROPHYSICAL PROPERTIES OF AN EARTH FORMATION BY REGULARIZED DIRECT INVERSION OF ELECTROMAGNETIC SIGNALS

(71) Applicant: BAKER HUGHES INCORPORATED, Houston, TX (US)

(72) Inventors: Babak Kouchmeshky, Kingwood, TX (US); Otto N. Fanini, Stafford, TX (US); Alberto Mezzatesta, Houston, TX (US)

(73) Assignee: BAKER HUGHES HOLDINGS LLC, Houston, TX (US)

( * ) Notice: Subject to any disclaimer, the term of this patent is extended or adjusted under 35 U.S.C. 154(b) by 170 days.

(21) Appl. No.: 15/406,308

(22) Filed: Jan. 13, 2017

(65) Prior Publication Data
US 2018/0203151 A1    Jul. 19, 2018

(51) Int. Cl.
*G01V 3/26* (2006.01)
*G01V 3/30* (2006.01)
*G01V 3/38* (2006.01)

(52) U.S. Cl.
CPC ............... *G01V 3/26* (2013.01); *G01V 3/30* (2013.01); *G01V 3/38* (2013.01)

(58) Field of Classification Search
CPC ...................................................... G01V 3/26
See application file for complete search history.

(56) References Cited

U.S. PATENT DOCUMENTS

| | | | |
|---|---|---|---|
| 4,899,112 A | 2/1990 | Clark et al. | |
| 5,081,419 A | 1/1992 | Meador et al. | |
| 5,675,147 A * | 10/1997 | Ekstrom | G01V 11/00 250/256 |
| 5,706,194 A * | 1/1998 | Neff | G01V 1/282 702/14 |
| 5,811,973 A | 9/1998 | Meyer, Jr. | |
| 5,835,882 A | 11/1998 | Vienot et al. | |
| (Continued) | | | |

OTHER PUBLICATIONS

Haber, E. et al., "Joint Inversion: a structural approach," Inverse Problems 13 pp. 63-77 (1997).

(Continued)

*Primary Examiner* — Hyun D Park
(74) *Attorney, Agent, or Firm* — Mossman Kumar & Tyler

(57) ABSTRACT

Methods and apparatus for evaluating an earth formation intersected by a borehole. Methods include using at least one transmitter to generate electromagnetic (EM) waves propagating through the formation; generating measurement signals at at least one receiver responsive to the propagating EM waves; taking a plurality of propagation measurements from the measurement signals representative of the propagating EM waves, where each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves; and performing a single inversion which uses the plurality of propagation measurements as input and generates at least one petrophysical parameter as output.

18 Claims, 16 Drawing Sheets

(56) References Cited

U.S. PATENT DOCUMENTS

| | | | |
|---|---|---|---|
| 6,049,209 | A | 4/2000 | Xiao et al. |
| 6,219,619 | B1 | 4/2001 | Xiao et al. |
| 6,302,221 | B1 | 10/2001 | Hamman et al. |
| 6,591,194 | B1 | 7/2003 | Yu et al. |
| 6,662,109 | B2 | 12/2003 | Roggero et al. |
| 7,636,275 | B2 | 12/2009 | Anno et al. |
| 8,126,651 | B2 | 2/2012 | Saltzer et al. |
| 8,498,848 | B2 | 7/2013 | Habashy et al. |
| 8,700,372 | B2 | 4/2014 | Priezzhev et al. |
| 8,908,474 | B2 | 12/2014 | Chu et al. |
| 9,152,745 | B2 | 10/2015 | Glinsky |
| 2002/0173915 | A1* | 11/2002 | Egermann ............ G01N 15/08 702/12 |
| 2007/0061082 | A1 | 3/2007 | Seleznev et al. |
| 2010/0332198 | A1* | 12/2010 | Wahrmund ............ G01V 3/083 703/2 |
| 2014/0102694 | A1* | 4/2014 | Hargreaves ........... G01V 1/003 166/250.01 |
| 2015/0025807 | A1* | 1/2015 | Anderson ............. G01V 3/30 702/11 |
| 2015/0100241 | A1 | 4/2015 | Theune |
| 2015/0369940 | A1 | 12/2015 | Wiik et al. |
| 2016/0040531 | A1 | 2/2016 | Ramakrishnan et al. |
| 2016/0047934 | A1 | 2/2016 | Wang et al. |
| 2016/0170069 | A1 | 6/2016 | Wang et al. |
| 2016/0363686 | A1 | 12/2016 | Kouchmeshky et al. |

OTHER PUBLICATIONS

Hizem, Mehdi et al., "Dielectric Dispersion: A New Wireline Petrophysical Measurement," SPE116130, 21 pp. (2008).

Mosse, Laurent et al., "Dielectric Dispersion Logging in Heavy Oil: A Case Study from the Orinoco Belt," SPWLA 50th Annual Logging Symposium, 16 pp. (2009).

Leeuwenburgh, Olwijn et al., "Ensemble-based conditioning of reservoir models to seismic data," Comput Geosci 15:359-378 (2011).

Kouchmeshky, Babak, et al., "Validating Mixing Models for Dielectric Logging (Russian)," SPE-182096-RU 15 pp. (2016).

PCT Application No. PCT/US2018/013565 International Search Report dated May 10, 2018.

\* cited by examiner

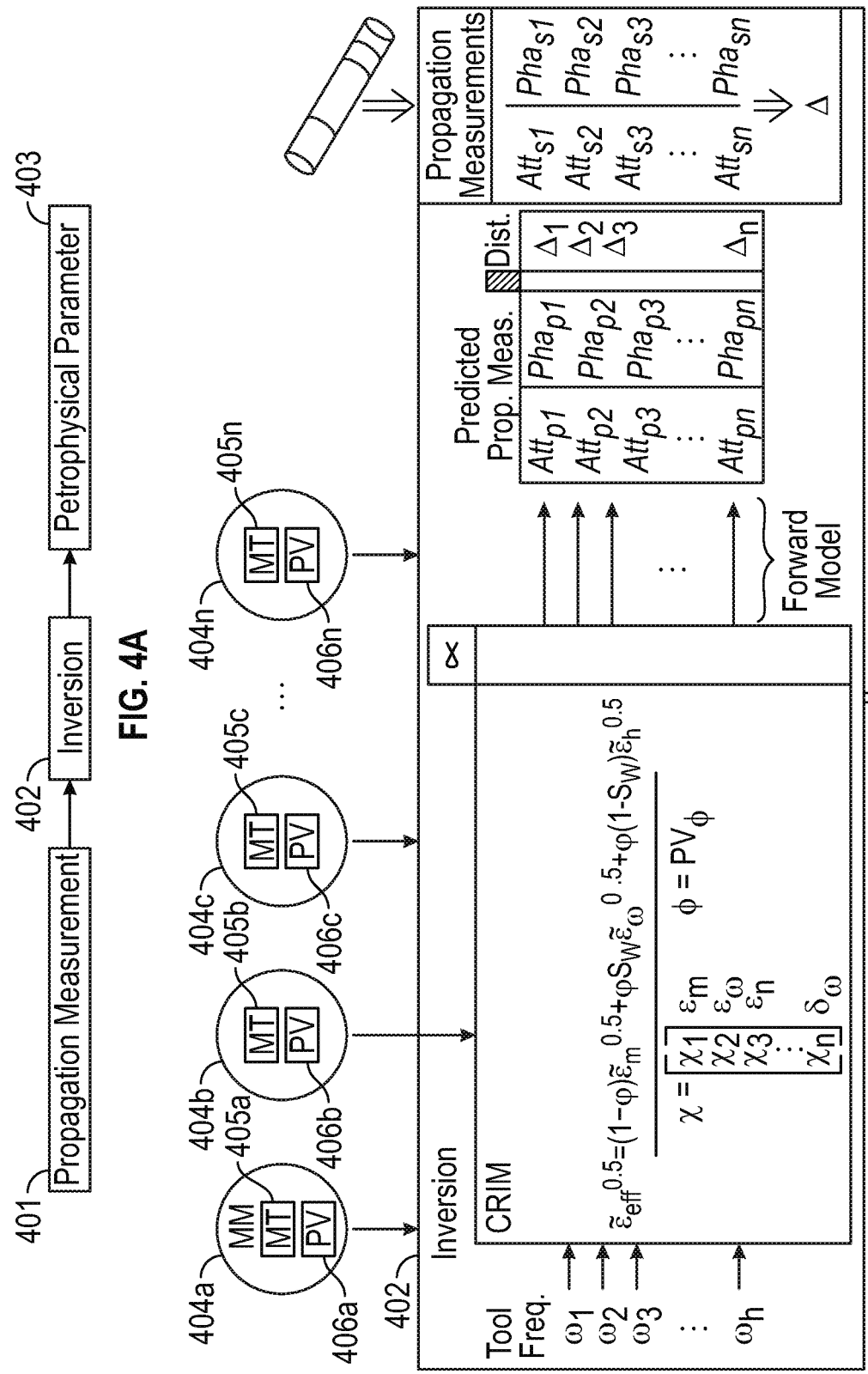

MEASURING PETROPHYSICAL PROPERTIES OF AN EARTH FORMATION BY REGULARIZED DIRECT INVERSION OF ELECTROMAGNETIC SIGNALS

FIELD OF THE DISCLOSURE

This disclosure generally relates to exploration and production of hydrocarbons involving investigations of regions of an earth formation penetrated by a borehole. More specifically, the disclosure relates to interpretation of electromagnetic propagation measurements of an earth formation.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix, and water saturation.

Parameters of interest of the formation, such as, for example, resistivity or dielectric constant, may be estimated by transmitting an electromagnetic (EM) wave into the formation, and receiving it at one or more receivers (e.g., at receiver antennas). The attenuation and phase shift between the received signals and the transmitted signals may be determined, which may then be used to estimate the complex dielectric constant of the formation. Alternatively, the attenuation and phase shift between spaced receivers may be determined and then used to estimate the complex dielectric constant of the formation.

SUMMARY OF THE DISCLOSURE

In aspects, the present disclosure is related to methods, apparatus, and produces for determining at least one parameter of interest of an earth formation. Methods include evaluating an earth formation intersected by a borehole. Methods include using at least one transmitter to generate a plurality of electromagnetic (EM) waves propagating through the formation; generating measurement signals at at least one receiver responsive to the plurality of propagating EM waves; taking a plurality of propagation measurements from the measurement signals representative of the propagating EM waves, where each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves; and performing a single inversion which uses the plurality of propagation measurements as input and generates at least one petrophysical parameter as output.

Performing the single inversion may comprise including at least one petrophysically based regularization model in the inversion. The inversion may comprise a single step. The inversion may be performed on the at least one petrophysical parameter and the plurality of propagation measurements simultaneously. The plurality of EM waves may be generated by the at least one transmitter at a plurality of frequencies. Methods may include selecting at least one petrophysical mixing model for the inversion; and regularizing the inversion.

Regularizing the inversion may include incorporating a priori data into the inversion, the a priori data comprising information about probable values of parameters in the mixing model. The a priori data may include a probability distribution function representing the probable values of the parameters of the mixing model. Regularizing the inversion may include incorporating a priori data into the inversion, the a priori data comprising information about probable values of formation properties constraining the inversion. The a priori data may include a probability distribution function representing the probable values of the formation properties. Methods may include selecting the at least one petrophysical mixing model in dependence upon at least one estimated lithology of the formation.

Methods may include representing predicted EM properties of the formation as a dispersive relation for calculated permittivity values and conductivity values of the formation. Methods may include using the EM properties to simulate tool responses using a forward model to generate predicted responses. Methods may include, in response to determining the predicted responses are not substantially similar to the plurality of propagation measurements, modifying at least one of: i) the at least one petrophysical mixing model; and ii) the forward model. Methods may include generating an electrical property of the formation as output. The electrical property may include at least one of: i) a frequency dependent conductivity parameter; and ii) a frequency dependent permittivity parameter. Methods may include estimating a solution space for the at least one petrophysical parameter. Performing the single inversion may be carried out using a discretized formation model as a forward model.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIGS. 4A & 4B illustrate inversion techniques in accordance with embodiments of the present disclosure.

DETAILED DESCRIPTION

Figure 1A:
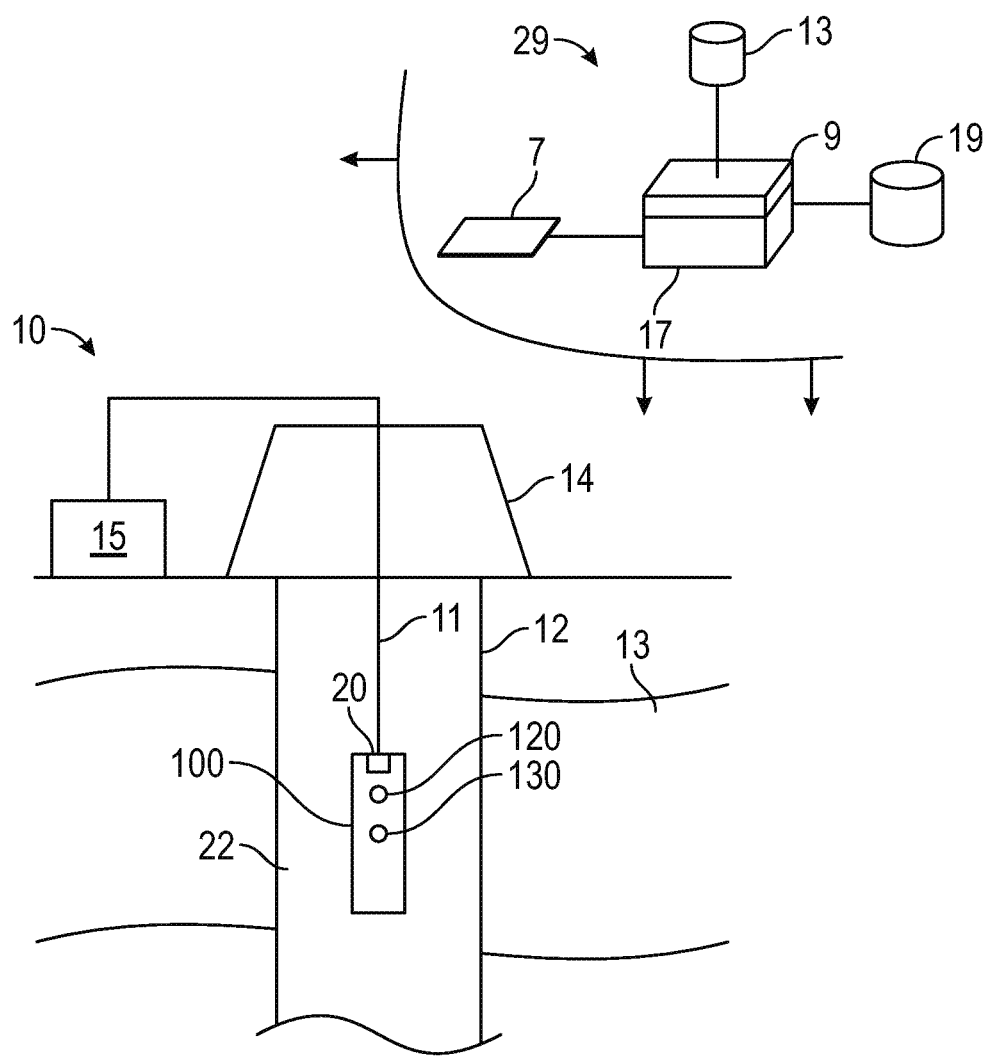
FIG. 1A shows an exemplary embodiment of a system for evaluation of an earth formation using measurements from a downhole electromagnetic tool.

This disclosure generally relates to exploration for hydrocarbons involving electromagnetic investigations of a borehole penetrating an earth formation. These investigations may include estimating at least one parameter of interest of the earth formation. New techniques in processing of EM signals improve tool functionality, as described below.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Dielectric logs can be used to obtain petrophysical properties of a formation such as water saturation, water resistivity at direct current ('DC'), and formation texture. Dielectric tools operate at a wide frequency range from a few MHz to a few GHz. Since the gathered data is inevitably contaminated with noise, techniques which mitigate the effect of noise on the results of interpretation of the dielectric log are very useful. For example, values of properties of the formation may be estimated using log data, and techniques which mitigate the effect of noise on the estimated property values are highly desired.

The present disclosure relates to inversion methods used for interpretation of dielectric logs, that is, the translation of raw electrical measurement information into measured property values for the formation wherein the electrical measurement was conducted. Classical methods of inversion involve inverting for the electromagnetic properties of the formation (permittivity and conductivity) from magnitude and phase of electromagnetic waves recorded at a receiver on a tool. These electromagnetic properties are obtained over a range of frequencies to obtain their variation with respect to frequency (dispersion). This dispersive behavior of permittivity and conductivity is then used in a second inversion step to obtain petro-physical properties of formation. For this step, valid mixing models are required to relate petro-physical parameters of the formation and dispersive electromagnetic properties. The presence of noise in the data can lead to ill-posed inverse problems which are problematic.

An inversion methodology is disclosed herein that combines the two steps of inversion into one. In doing so, only one inversion problem needs to be solved—this inversion problem directly obtains the petro-physical parameters. It is shown that the new inversion method can seamlessly take advantage of regularization of the petro-physical parameters and structure the electromagnetic properties of formation using mixing models to provide more robust and accurate results.

FIG. 1A shows an exemplary embodiment of a system for evaluation of an earth formation using measurements from a downhole electromagnetic tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications. As described herein, "formations" refer to the various features and materials that may be encountered in a subsurface environment and surround the borehole. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc) refer to the direction of travel along the borehole either toward or away from the surface, with the upward direction being toward the surface and the downward direction being away from the surface.

In some embodiments, the system 10 includes a downhole wireline tool 100 suspended in a borehole 12 penetrating an earth formation 13 from a suitable carrier 11, such as a cable that passes over a sheave mounted on a derrick 14. The cable may include a stress member and a number of conductors (typically seven) for transmitting commands to the tool 100 from the surface, receiving data at the surface from the tool, and supplying power to the tool. The tool 100 may be raised and lowered by a draw works.

Downhole tool 100 may be coupled or combined with additional tools including some or all the hardware environment 29, described in further detail below. The hardware environment 29 may implement one or more control units configured to operate the tool 100 or other components of system 10, and/or conduct method embodiments disclosed below. The hardware environment 29 may include at least one processor, implemented, for example, as a suitable computer. The hardware environment 29 may be located downhole, at the surface, and/or remotely and provide for performing data analysis in the field (including in real time), or alternatively, the recorded data may be sent to a remote processing center for post processing of the data. Also, the data may be partially processed in real time and partially at a processing center.

A surface control system 15 may receive signals from downhole sensors and other sensors used in the system 10 and processes such signals according to programmed instructions provided to the surface control system 15. The surface control system 15 may display desired parameters and other information on a display/monitor that is utilized by an operator. The surface control system 15 may further communicate with a downhole control system 20 at a suitable location on downhole tool 10. The surface control system 15 may process data relating to the operations and data from the sensors, and may control one or more downhole operations performed by system 100.

In one embodiment, electronics associated with sensors 120 and/or 130 may be configured to record and/or process the information obtained. Certain embodiments of the present disclosure may be implemented with a hardware environment 29 that includes an information processor 17, an information storage medium 13, an input device 7, processor memory 9, and may include peripheral information storage medium 19. The hardware environment may be in the well, at the rig, or at a remote location. Moreover, the several components of the hardware environment may be distributed among those locations. The input device 7 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the sensors may be configured to take measurements at a plurality of borehole depths as the tool moves along the longitudinal axis of the borehole. These measurements may be substantially continuous, which may be defined as being repeated at very small increments of depth, such that the resulting information has sufficient scope and resolution to provide an image of borehole parameters. As described herein, "borehole" or "wellbore" refers to a single hole that makes up all or part of a drilled well. Depending on the configuration, the system may be used during drilling and/or after the wellbore has been formed. While a land system is shown, the teachings of the present disclosure may also be utilized in offshore or subsea applications.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In other embodiments, such electronics may be located elsewhere (e.g., at the surface, or remotely). To perform the measurement during a single trip, the tool may use a high bandwidth transmission to transmit the information acquired using sensor components 20 and 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the measurement activity in "real time." Each of the components described above may be implemented as one or more electrical components, such as integrated circuits (ICs), operatively connected via a circuit board in accordance with techniques of the present disclosure.

A point of novelty of the system illustrated in FIG. 1A is that the control unit(s), together with electromagnetic transmission and receiving components, are configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging. In some embodiments, the electromagnetic tool may include at least one transmitting antenna and at least one receiving antenna, which may be disposed on a tool body, such as a tool mandrel or other tool housing, mounted on a pad, and so on as will occur to those of skill in the art.

Figure 1B:
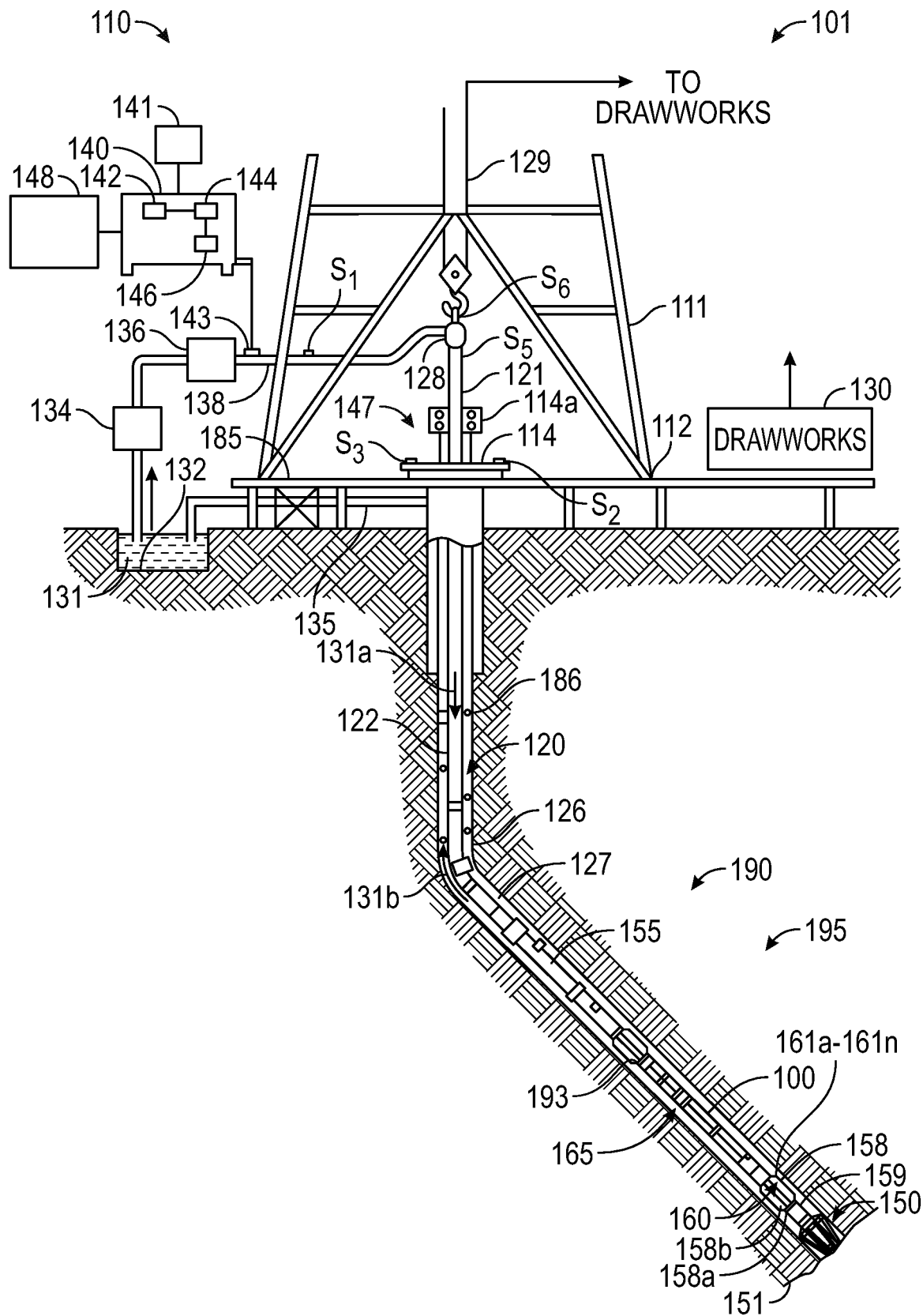
FIG. 1B shows an exemplary embodiment of an MWD system for evaluation of an earth formation using measurements from a well logging tool.

Aspects of the present disclosure are subject to application in various different embodiments. In some general embodiments, carrier 15 is implemented as a tool string of a drilling system, and measurements taken in the borehole may be characterized as "logging-while-drilling" (LWD) or "measurement-while-drilling" (MWD) operations. FIG. 1B shows an exemplary embodiment of an MWD system for evaluation of an earth formation using measurements from a well logging tool. The system 101 includes a carrier 111 that is shown disposed in a wellbore or borehole 126 that penetrates at least one earth formation 195.

FIG. 1B shows a drill string 120 including a bottomhole assembly (BHA) 190 conveyed in the borehole 126 as the carrier. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a discharger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays drilling parameters and other parameters of interest related to the borehole, formation, and drilling operations, and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, and data received from downhole; and may control one or more operations of the downhole and surface devices. The data may be transmitted in analog or digital form.

The BHA 190 may include a tool 110 configured for performing well logging measurements. The BHA 190 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 150. For convenience, all such sensors are generally denoted herein by numeral 165. The BHA 190 may further include a variety of other sensors and devices 159 for determining one or more properties of the BHA 190, such as vibration, bending moment, acceleration, oscillations, whirl, stick-slip, weight-on-bit, fluid flow rate, pressure, temperature, rate of penetration, azimuth, tool face, drill bit rotation, etc.

The BHA 190 may include a steering apparatus or tool 158 for steering the drill bit 50 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 120 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control of system 101 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 142 can process the surface measured data, along with the data transmitted from the downhole processor, to evaluate the formation.

Surface processor 142 or downhole processor 193 may also be configured to control steering apparatus 158, mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of these components may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, steering the drillbit (e.g., geosteering, including cessation of further advancement of the drillbit), altering the drilling fluid program, activating well control measures, and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 142, downhole processor 193, or other processors (e.g. remote processors) may be configured to operate the well logging tool 110 to make well logging measurements. Each of these logical components of the drilling system may be implemented as electrical circuitry, such as one or more integrated circuits (ICs) operatively connected via a circuit board in accordance with techniques of the present disclosure.

The system 101 may include any number of downhole tools for various processes including formation drilling, geosteering, and formation evaluation (FE) for making measurements versus depth and/or time of one or more physical properties in or around a borehole, including a volume of interest of the formation intersected by the borehole. The tool 110 may be included in or embodied as a BHA, drillstring component or other suitable carrier.

While a drill string 120 is shown as a conveyance device for tool 110, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic (EM) tool configured to generate an electric current at a plurality of frequencies.

EM Tools

Figure 2A:
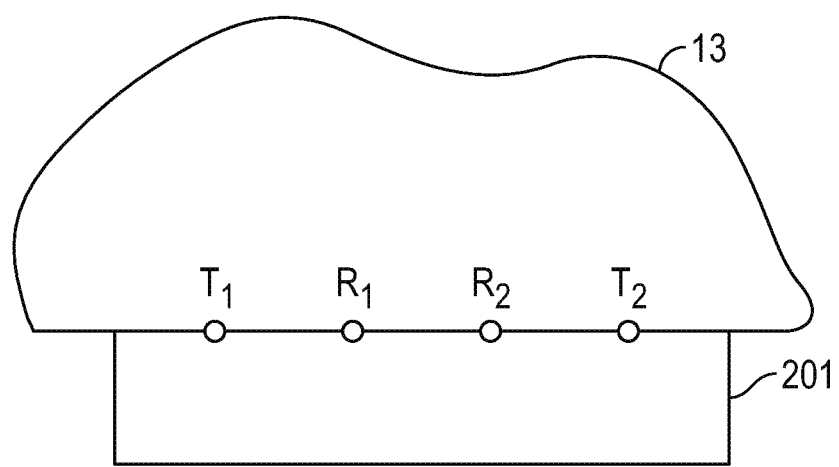
FIG. 2A depicts a cross-sectional view of downhole tool in a homogenous medium.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1. Methods for obtaining EM propagation measurements (e.g., relative phase and attenuation) using these tools are well known in the art. See for example, U.S. patent application Ser. No. 13/991,029 to Dorovsky et al. and U.S. patent application Ser. No. 15/280,815 to Kouchmeshky et al., each incorporated herein by reference.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}^{T1} = \theta_{R_2}^{T1} - \theta_{R_1}^{T1} \quad (15)$$

The relative phase shift between R1 and R2 when T2 is fired may be given by:

$$\theta_{R_1R_2}^{T2} = \theta_{R_1}^{T2} - \theta_{R_2}^{T2} \quad (16)$$

The compensated relative phase may be given by:

$$\theta_{R_1R_2} = 0.5(\theta_{R_1R_2}^{T1} + \theta_{R_1R_2}^{T2}) \quad (17)$$

where $\theta_{R_j}^{Ti}$ is the phase measured by receiver j when transmitter i is fired and can be written as $$\theta_{R_j}^{Ti} = \theta_{T_i} + \theta_{R_j} + \theta(r) \quad (18)$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (15) and (16) eliminate the effect of internal phase shift at T1 and T2. As it can be seen from plugging in Equation (18) in Equations (15) and (16) and using Equation (17) one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
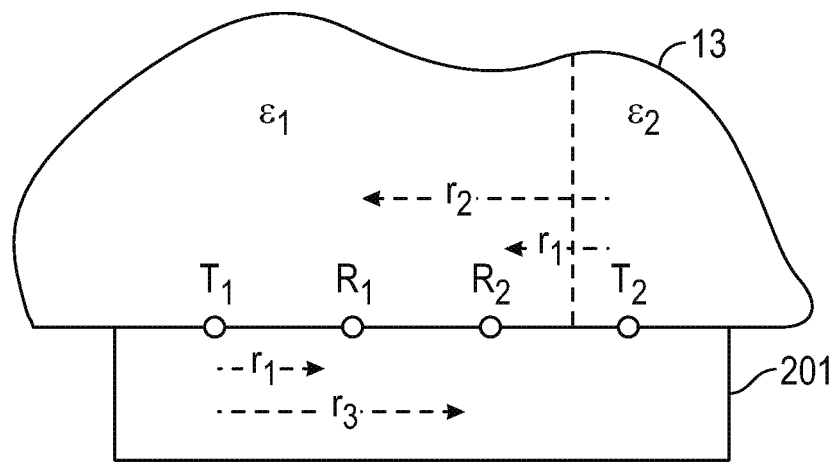
FIG. 2B depicts a cross-sectional view of a tool in heterogenous media having relative permittivities, $\varepsilon 1$ and $\varepsilon 2$.

FIG. 2B depicts a cross-sectional view of tool 201 in heterogenous media having relative permittivities, $\epsilon_1$ and $\epsilon_2$. Generally, for an electromagnetic wave propagating in a near field regime, the phase difference between the wave passing through points in space is not only a function of the distance between the two points $(r_2-r_1)$ but also a function of absolute position of those points $(r_1$ and $r_2)$. Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\epsilon_2 > \epsilon_1$).

Figure 2C:
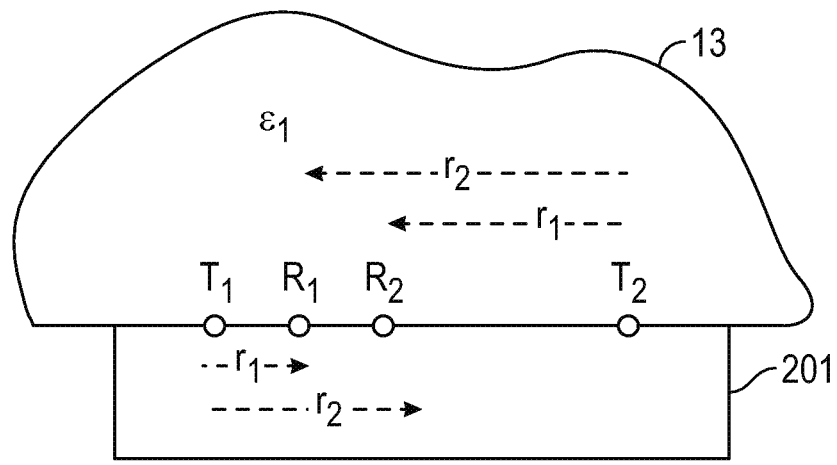
FIG. 2C shows the approximate effect of heterogeneous media on the propagation of an electromagnetic wave.

FIG. 2C shows the approximate effect of heterogeneous media on the propagation of an electromagnetic wave. Referring to FIGS. 2B-2C, although $r_2-r_1=r^*_2-r^*_1$, $r_2 \neq r^*_2$ and $r_1 \neq r^*_1$; thus, the "simulated" distances between transmitter and receivers from the left and right are not equal. This leads to an unequal phase shift for an electromagnetic wave travelling from these transmitters, which renders the traditional approach invalid.

Figure 2D:
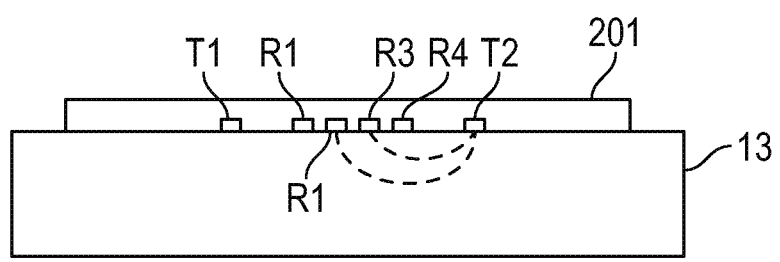
FIG. 2D shows the phase shifts of wave propagation tool according to embodiments of the present disclosure.

FIG. 2D shows the phase shifts of wave propagation tool 207 according to embodiments of the present disclosure. Tool 207 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1} = \theta_{T_1R_3} - \theta_{R_3}^{sh} \quad (19)$$

$$\theta_{R_2}^{T1} = \theta_{T_1R_2} - \theta_{R_2}^{sh} \quad (20)$$

where $\theta_{R_j}^{Ti}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T1} - \theta_{R_3}^{T1}$) may be expressed as:

$$\theta_{R_2R_3}^{T1} = \theta_{T_1R_2} + \theta_{R_2}^{sh} - \theta_{T_1R_3} - \theta_{R_3}^{sh} \quad (21)$$

Upon firing transmitter T2, the phase shifts at R2 and R3 may be expressed as:

$$\theta_{R_3}^{T2} = \theta_{T_2R_3} - \theta_{R_3}^{sh} \quad (22)$$

$$\theta_{R_2}^{T2} = \theta_{T_2R_2} - \theta_{R_2}^{sh} \quad (23)$$

The relative phase shift between receivers R3 and R2 after firing transmitter T2 may be expressed as $(\theta_{R_3}^{T2} - \theta_{R_2}^{T2})$:

$$\theta_{R_3R_2}^{T2} = \theta_{T_2R_3} + \theta_{R_3}^{sh} - \theta_{T_2R_2} - \theta_{R_2}^{sh} \quad (24)$$

Conventionally, it may be assumed that these phase shifts are equal:

$$\theta_{T_2R_2} = \theta_{T_1R_3}, \theta_{T_2R_3} = \theta_{T_1R_2} \quad (25)$$

After substituting $\theta_{T_1R_2}$ and $\theta_{T_1R_3}$ into Eq. (24), the relative phase shift between receivers R3 and R2 after firing transmitter T2 (i.e., $\theta_{R_3}^{T2} - \theta_{R_2}^{T2}$) may be given by:

$$\theta_{R_3R_2}^{T2} = \theta_{T_1R_2} + \theta_{R_3}^{sh} - \theta_{T_1R_3} - \theta_{R_2}^{sh} \quad (26)$$

Thus, a compensated measurement for the relative phase between receivers R3 and R2 may be given as:

$$\theta_{R_2R_3}^{com} = \frac{(\theta_{R_2R_3}^{T_1} + \theta_{R_3R_2}^{T_2})}{2} \quad (27)$$

$$\theta_{R_2R_3}^{com} = \theta_{T_1R_2} - \theta_{T_1R_3} \quad (28)$$

Techniques in accordance with embodiment of the present disclosure as described herein may be employed in connection with a variety of downhole tools conveyed on various carriers. Several general examples are described hereinbelow.

Figure 3A:
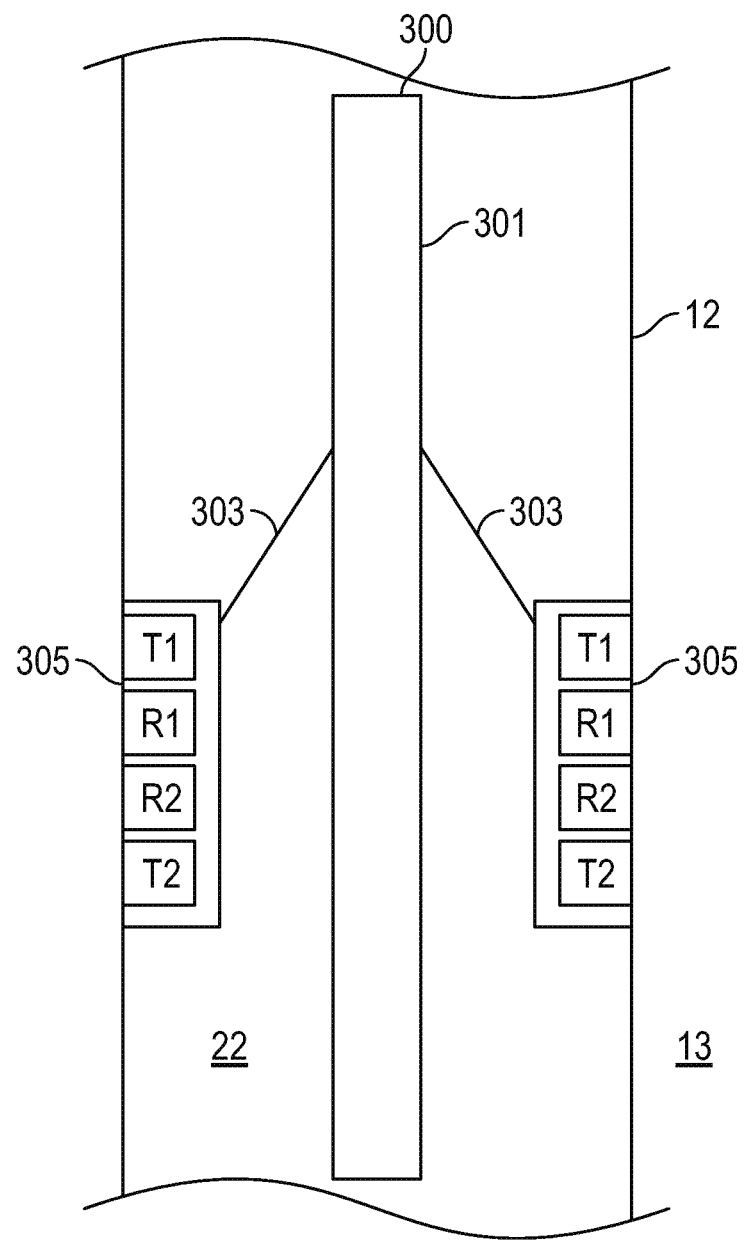
FIG. 3A shows a downhole logging tool for evaluating an earth formation in accordance with embodiments of the present disclosure.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the volume under investigation, such as water saturation, water conductivity, water permittivity, permittivity of dry rock, permittivity of hydrocarbons, textural parameters of the formation (e.g., grain shape), cation exchange capacity ('CEC'), and total porosity.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest. A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors hardware environment 29.

Figure 3B:
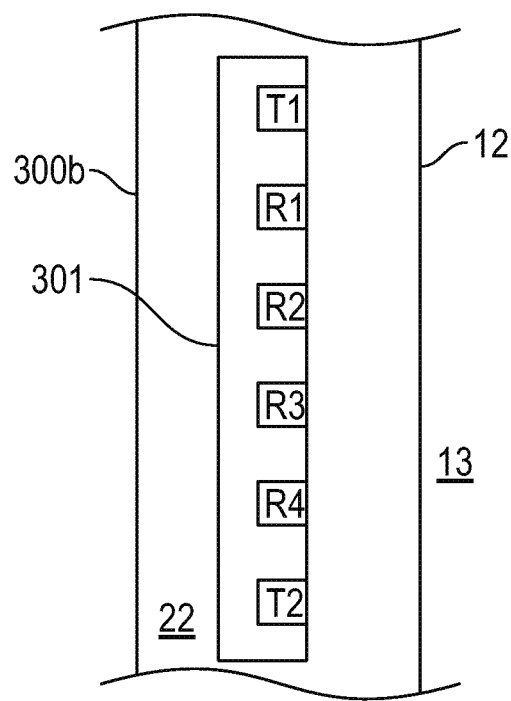
FIG. 3B shows a cross-sectional view of a multi-frequency dielectric logging tool in accordance with embodiments of the present disclosure.

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

Figure 3C:
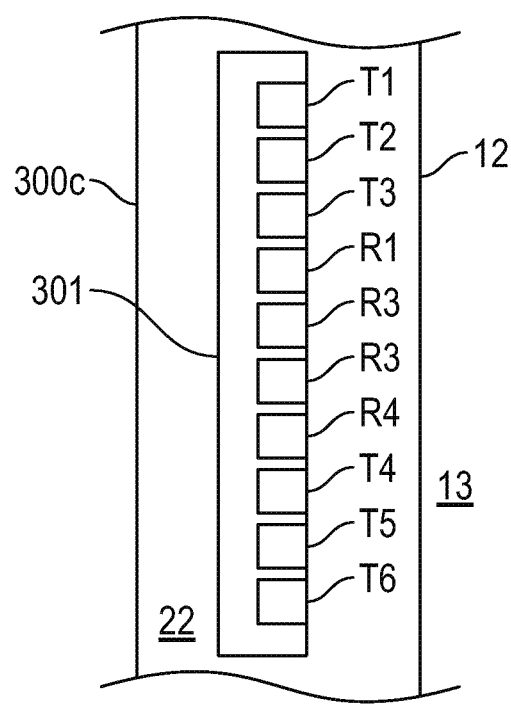
FIG. 3C shows a cross-sectional view of multi-frequency dielectric logging tool in accordance with embodiments of the present disclosure.

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than $\pi$ radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies.

Parameters of Interest

Resistivity may be estimated from attenuation and phase difference using a transform, by curve fitting techniques, or using a lookup table. Additional details may be found in U.S. Pat. No. 5,081,419 to Meador et al. and U.S. Pat. No. 4,899,112 to Clark et al., each of which is herein incorporated by reference in its entirety. These measured values can be used to determine and store resistivity from attenuation [$R_{AT}$] and/or resistivity from phase shift [$R_\varphi$]. Various corrections may be made to the resistivity values in accordance with techniques of the art. The two values may be associated with various depths of investigation and/or combined as would occur to those of skill in the art.

Those versed in the art would recognize that measurements of amplitude and phase can, in addition to resistivity determination, also be used for determining the dielectric constant of the earth formation. Dielectric logging uses the contrast between dielectric constant of water, rock and oil to estimate the formation water content. The permittivity of the formation can be considered as a complex quantity which contains dielectric constant and conductivity in its real and imaginary component $$\tilde{\varepsilon}_r(\omega) = \varepsilon_r(\omega) + i\frac{\sigma(\omega)}{\omega\varepsilon_0} \quad (10)$$

where $\tilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

The dispersive behavior of the formation is a result of the properties of its constituents (water, rock matrix and hydrocarbon) as well as the volume fraction of each of these phases, their geometry and distribution within a representative volume of the formation. However, the mixture of these three phases exhibits a dispersive behavior different from the weighted average of dispersive behavior of each. There exist several mixing laws (or mixing models) that relate the dielectric behavior of a mixture to the properties of its constituents. Several dielectric models have been set forth which attempt to approximate the permittivity of mixtures in terms of the known dielectric constants and volume fractions of the constituents. Some example mixing models include the Complex Refractive Index Model (CRIM) and Looyenga-Landau-Lifshitz model, along with other exponential models, and variants of the Maxwell-Garnett model, including the Coherent Potential model, and the Symmetric Bruggeman Model.

Typically, the dielectric constants of the materials are complex numbers, which results in a complex effective permittivity for the mixture. This is reflective of the dependence of the response of the materials to the frequency of the electric field. Since the response of materials to alternating fields is characterized by a complex permittivity, it is natural to separate its real and imaginary parts, which is done by convention in the following way:

$$\varepsilon(\omega)=\varepsilon'(\omega)-i\varepsilon''(\omega)$$

wherein $\varepsilon'$ is the real part of the permittivity, which is related to the stored energy within the medium and $\varepsilon''$ is the imaginary part of the permittivity, which is related to the dissipation (or loss) of energy within the medium.

The parameters of the volume of interest of the formation affecting dielectric behavior of the formation include water saturation, water conductivity, permittivity of dry rock, permittivity of hydrocarbons, textural parameters of the formation (e.g., grain shape), and total porosity. As dielectric dispersive behavior of the volume is sensitive to these parameters, measuring the dielectric behavior of the formation at multiple frequencies provides a means to quantify these parameters.

Measuring the dielectric dispersive behavior of the formation and fitting it to mixing laws that are shown to be representative of the behavior of the formation under study provides information on the volume fraction of each component and formation texture information. This may include estimating the permittivity of the various materials within the volume under investigation. Electric permittivity may include imaginary and real parts, which may vary with the frequency of an electrical signal exposed to a material.

Other models may be employed to correlate electrical properties of volumes of interest of an earth formation with other formation properties. One of the most widely used models is the Archie relation, or Archie's law, formulated by Gus Archie. Archie's law is an empirical law that is widely used to calculate the electrical conductivity of the formation based on porosity of rock, water saturation and conductivity. Archie's law (expressed in one format) is as follows:

$$\sigma_{\mathit{eff}} = \frac{1}{a}\phi^m S_w^n \sigma_w \quad (11)$$

where $\sigma_{\mathit{eff}}$ is conductivity of a formation at DC, $\varphi$ is porosity of the rock matrix of the formation, $S_W$ is water saturation of the formation, $\sigma_W$ is water conductivity of the formation at DC, $\alpha$ is tortuosity factor, m is cementation exponent, and n is saturation exponent. The parameters $\alpha$, m, and n are referred to as Archie parameters. The cementation exponent is related to connectivity of the pore structure of the rock and it decreases as the fluid permeability of rock increases. The saturation exponent is related to wettability of rock. In the case of water wet rocks, even for low water saturation levels, a continuous electrical path can form due to presence of a thin layer of water around the grains. The tortuosity depends on grain size and pore structure.

Petrophysical information, when accurate, is invaluable for estimating the hydrocarbon content in the reservoir under study. Accurate determination of these measurements can be challenging, however. Model-based formation evaluation by inversion of formation log data (phase and attenuation values at multiple frequencies) has uncertainties when resolving formation reservoir structural description parameters of economic evaluation interest, such as, for example three-dimensional structures. These uncertainties are compounded when the inverted formation evaluation parameters resulting from inversion processing of the log data are subsequently used in further processing. The log data may be used sequentially in further processing steps for petrophysical, geological, mineralogical characterization, as well as the generation of descriptive and predictive reservoir databases and production performance estimations, at which point these compounded errors become quite problematic.

Aspects of the present disclosure include an innovative interpretation process flow for measuring petrophysical properties of an earth formation by regularized direct inversion of multi-frequency array dielectric signal data. This interpretation may be based on multi-physics inversion of all of the formation evaluations log and reservoir production history data, resulting in a one-step direct inversion methodology regularized by petrophysical, geological, mineralogy, descriptive & predictive reservoir database models, and production performance estimations.

Signal data may be generated by the multi-frequency array dielectric signals at a tool. At least one transmitter generates a plurality of electromagnetic (EM) waves propagating through the formation, resulting in measurement signals generated at at least one receiver responsive to the plurality of propagating EM waves. A plurality of propagation measurements may be taken from the measurement signals representative of the propagating EM waves. Each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves.

Thus, estimating parameters of interest of the formation may be achieved by performing a single-step inversion taking the plurality of propagation measurements as input and generating one or more petrophysical parameters as output. Other parameters of the formation may be generated as output as well.

This novel inversion approach yields a more robust, resilient, and reliable interpretation which is considerably more tolerant to instrumentation noise, variable spatial resolution, variable depth of investigation, and data inaccuracies. Aspects of the disclosure may include a corresponding model selection based on a priori model characterization of known reservoir rocks which may enhance the reservoir data interpretation solution. Examples of results of the techniques of the present disclosure are provided to demonstrate improvement in the obtained inversion results.

Measuring Petrophysical Properties of an Earth Formation by Regularized Direct Inversion of Electromagnetic Signals FIGS. 4A & 4B illustrate inversion techniques in accordance with embodiments of the present disclosure. Referring to FIG. 4A, the single inversion 402 uses the plurality of propagation measurements 401 as input, and generates at least one petrophysical parameter 403 as output. As described above, at least one EM transmitter is excited at each of a plurality of frequencies ('tool frequencies') to generate the propagating waves which are detected by the generation of signals at at least one receiver responsive to propagating waves ('tool response').

Referring to FIG. 4B, particular embodiments are shown in greater detail. Preliminary steps may begin with assembly of petrophysical models relating to desired petrophysical properties to be determined by inversion. Inversion 402 comprises iteratively using selected mixing models (MM)

404 to simulate predicted propagation measurements ($Att_{p1}$, $Pha_{p1}$, $Att_{p2}$, $Pha_{p2}$, $Att_{p3}$, $Pha_{p3}$, ... $Att_{pn}$, $Pha_{pn}$) at each of a plurality of tool frequencies subject to constraints α. Each mixing model 404a-404n comprises at least a mixing model type (MT) and a set of corresponding petrophysical parameter values (PV). The parameter values may include electrical properties of the formation, porosity, and so on. All or a portion of the simulation may be carried out prior to the measurement, or prior to conveyance of the tool. Alternatively, simulation may take place in real-time.

For each tool frequency ($\omega_1$, $\omega_2$, $\omega_3$ ... $\omega_n$), the predicted propagation measurements ($Att_{p1}$, $Pha_{p1}$, $Att_{p2}$, $Pha_{p2}$, $Att_{p3}$, $Pha_{p3}$, ... $Att_{pn}$, $Pha_{pn}$) for each parameterized model are compared against the actual (measured) propagation measurements ($Att_{p1}$, $Pha_{p1}$, $Att_{p2}$, $Pha_{p2}$, $Att_{p3}$, $Pha_{p3}$, ... $Att_{pn}$, $Pha_{pn}$), and a distance metric ($\Delta_1$, $\Delta_2$, $\Delta_3$, ... $\Delta_n$) is calculated for each tool frequency. Thus, the inversion is performed on the one or more petrophysical parameters and the plurality of propagation measurements simultaneously—they are elements of the same inverse problem. The distance metrics ($\Delta_1$, $\Delta_2$, $\Delta_3$, ... $\Delta_n$) may be used to calculate the distance $\Delta_{ti}$ for mixing model 404$_i$ for i=1 to m. The mixing model with the minimum value for distance $\Delta_{ti}$ may be used to determine the optimal model type and parameter values. In some implementations, the optimal model type and parameter values are estimated as those values for the model type 405c and parameter values 406c corresponding to the mixing model with the minimum value for distance $\Delta_{ti}$. Alternatively, those values are used to condition or constrain further inversion processes. This may be carried out in iterative sequential or joint inversions until confidence in the solution is sufficient. See, for example, Haber, E. and Oldenburg, D. Joint inversion: a structural approach. *Inverse Problems*, Vol. 13, No. 1 (1997).

The inversion may be further characterized below using $$\text{argmin}_X(\|M^*(\omega)-h(X,\varphi,\omega)\|_2+\alpha\|X-X_0\|_2) \quad (9)$$

where h is a 2×N vector that contains the calculated magnitude and phase at each frequency, M* is a 2×N vector that contains the measured magnitude and phase for all frequencies present in vector $\omega=[\omega_1, \omega_2, \ldots, \omega_N]$, vector X contains petro-physical parameters of a formation, φ is a porosity, vector $X_0$ contains expected values of petro-physical parameters and α is the regularization coefficient.

In calculating the elements of vector h the following steps may be taken. First, a predefined mixing model is chosen. Then, the petro-physical parameters assigned to vector X and porosity, φ, are used to find permittivity and conductivity of formation at angular frequencies in ω. The result is the electromagnetic properties of formation represented as a dispersive relation for permittivity and conductivity calculated for the petro-physical parameters, X. These electromagnetic properties are then passed to the forward model that predicts the behavior of the tool in the formation. This forward model can be a model that simplifies the transmitters and receivers as dipoles and assumes the formation to be homogenous or it can be a more detailed model taking into account the effect of finite size of the sensor, borehole effect and etc. Using the predicted electromagnetic properties of formation as inputs to the forward model leads to calculating values for the tool response in the format of relative magnitude and phase for each frequency. The resulting magnitude and phase populate the 2×N elements of vector h.

$$h=[mag_{\omega_1},phase_{\omega_1},mag_{\omega_2},phase_{\omega_2}, \ldots ,mag_{\omega_N}, phase_{\omega_N}] \quad (10)$$

where $mag_{\omega i}$ and $phase_{\omega i}$ are respectively the relative magnitude and relative phase between two receivers at frequency $\omega_i$. In this method the petro-physical parameters are directly obtained from one inversion. Reducing the number of inversion problems increases the tolerance to noise. In addition the regularization can be easily applied on the petro-physical parameters and since the mixing models are used in the forward model to generate the electromagnetic properties of the formation from petro-physical properties no regularization on the permittivity and conductivity values is needed. The petro-physical parameters obtained from the inversion can be used with the selected mixing model to generate the electromagnetic properties of the formation (dispersive relation).

The paper "Dielectric dispersion: A new wireline petrophysical measurement," SPE annual Technical Conference and Exhibition (2008), by Hizem et al. (hereinafter "Hizem") describes traditional methods for interpreting dielectric logs by splitting the inversion into two steps. This approach leads to two inversion problems with compounding error propagation. The first inversion problem is performed to obtain electromagnetic properties from tool response. Any information on dispersive behavior of electromagnetic properties requires knowledge on petrophysical parameters. Since in the traditional methods the petrophysical parameters are not taken into consideration before solution of the second inversion problem, no regularization that is based on verified theoretical models can be performed on this stage. Hence the traditional methods are vulnerable to noise and the resulting ill-posed inverse problem will result in inaccurate interpretation. In contrast, since the proposed inversion method has access to the petrophysical parameters through reformulation of the inverse problem it can use regularization methods to reduce the effect of noise on interpretation results. One novelty of the proposed method is to include petrophysically based regularization models in the inversion process and hence increase the tolerance to noise.

Figure 4C:
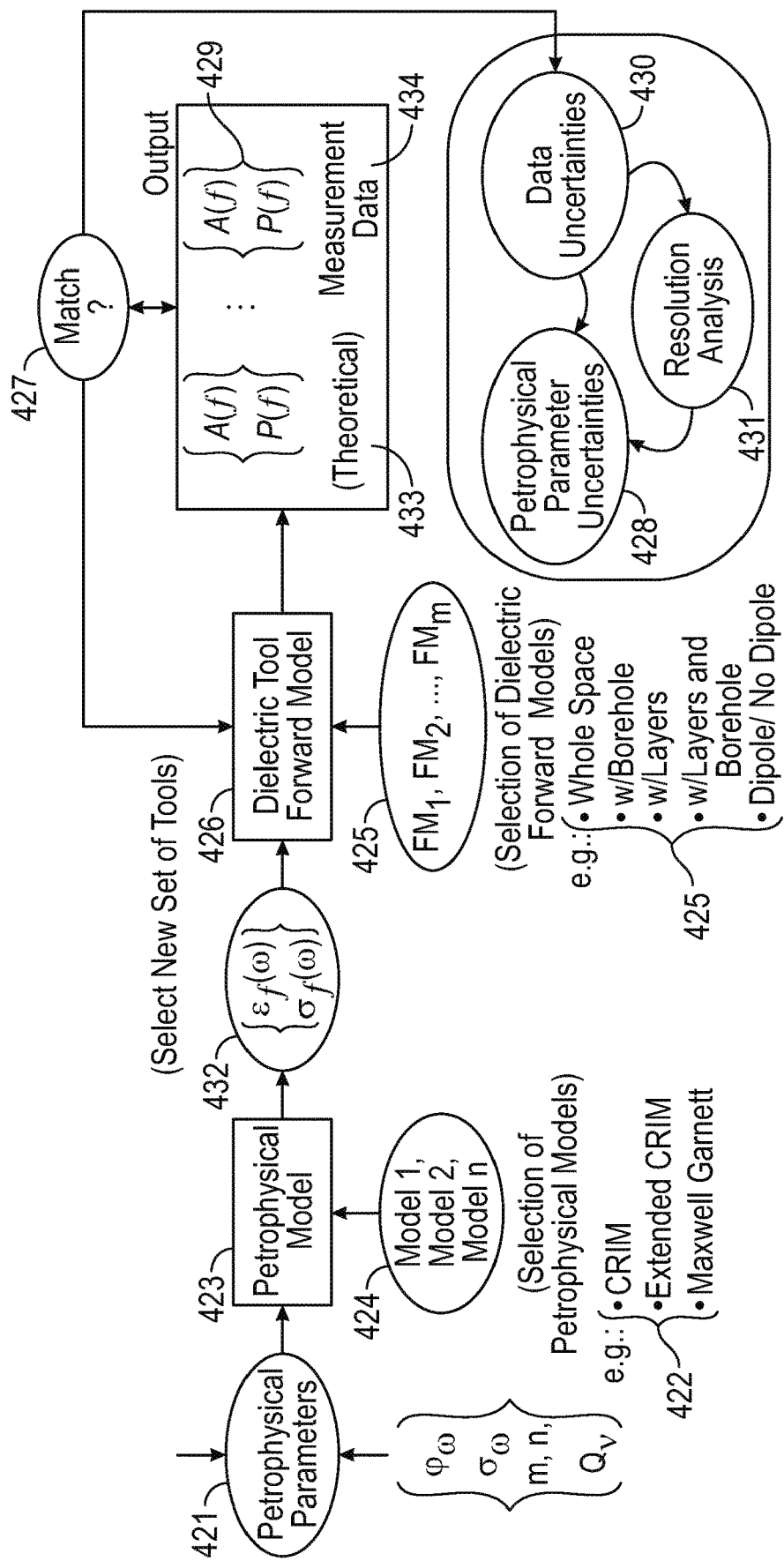
FIG. 4C illustrates inversion techniques in accordance with embodiments of the present disclosure in further detail.

FIG. 4C illustrates inversion techniques in accordance with embodiments of the present disclosure in further detail. At module 424, models 1 through N are generated using model templates from model type database 422 and associated values for corresponding petrophysical parameters 421 (e.g., $\varphi_w$, $\sigma_w$, m, n, $Q_v$, etc.), and. In some implementations, selection of desired petrophysical parameters 421 may influence model type selection or model generation. In later iterations, a solution space of parameter values may be constrained by previous inversion results, a prior formation knowledge, and so on.

At module 423, for each mixing model 1 through N, dielectric dispersion may 432 be estimated for both real and imaginary measurements where the input data is the response of the tool (relative magnitude and phase) and the output of the inversion are petrophysical parameters. The estimated dispersion may be a representation of values of permittivity and conductivity expressed as functions of tool frequency $\{\varepsilon_f(\omega), \sigma_f(\omega)\}$.

At module 426, forward models 1 through M from forward model database 425 are each used to simulate predicted tool responses 433. The selected model may be, for example, a whole space or half-space model, or more detailed variations, such as whole space with borehole, whole space with layers, or combinations of these, and may rely on dipole or non-dipole physics. Selection of an appropriate forward model may be based on our prior knowledge of formation strata (e.g., using resistivity or acoustic imaging tools), dielectric properties of mud, rugosity of the borehole (caliper readings), existence of standoff between pad and borehole wall (e.g., measured using coax sensors on the pad measuring reflection), location of the transmitter and receivers, and other a priori knowledge (e.g., proximity of the outer transmitter and receiver to the edge of the pad causes the response to be far from an ideal dipole due to discontinuity in the perfectly electric conductive medium).

Predicted responses are compared against measured responses 434 from module 429 by fitting module 427. The quality of the match between predicted and actual tool response is obtained through predefined tolerances obtained from sensitivity of tool response to petrophysical properties at each frequency. The results from fitting module 427 may be passed to modules 428, 430, 431 which contain iterative processes where the results and the quality of the data are compared (e.g., before and after logging, between different combinations of models and forward models, and so on). Comparisons between symmetric readings can help to obtain a measure of uncertainty on the collected data, which may indicate uncertainly in the inverted petrophysical parameters. Further, the global inversion using a coordinated forward model and parameterized mixing law dielectric response relationship for a certain rock or rock class may be employed to directly produce the resulting petrophysical parameters, identification of the appropriate mixing law and corresponding rock class behavior, and corresponding mixing law parameters (including textural parameters), such as, for example, the Archie parameters m and n, inclusions, CEC, inclusion factors, and so on as will occur to those of skill in the art. Output may be implemented as blocked units of rock classes following a particular type of mixing law (potentially with correlated rock properties such as permeability, porosity, grain size and shape, tortuosity, clay content, etc.).

The particular model types employed may comprise a selection of available mixing model types, and be constrained to a preliminary solution space estimation. For example, ground truth or other a priori data may be used to reduce the number of mixing models to be evaluated, such as, for example, prior knowledge of the presence of particular rock types in the formation (or in nearby formations). For example, analysis on core specimens obtained from the formation may reveal that certain mixing models have a higher probability in providing the petrophysical parameters within confidence limits. Here, "confidence limit" is defined as the range in which the parameter can be found with certain probability referred to as a confidence level. This information can be used in the process of selecting petrophysical models applicable to a formation by assigning appropriate weights to the fitting function. If analysis on the core data reveals that a particular mixing model corresponds to a higher probability of finding correct petrophysical parameters (or tighter confidence limits), then a larger weight is assigned to its fitness function when interpreting dielectric log data of the formation. In this way if two mixing models were shown to provide similar performance in reproducing tool response, then the model which was more promising based on prior studies may be selected.

A catalog of mixing law relationships for a range of rock classes describing the dielectric response of various rocks of interest may be used to provide the correlation between dielectric excitation, rock dielectric response, a particular parameterized mixing-law dielectric response relationship for a certain rock or rock class, and targeted petrophysical parameters. See, for example, "Validating mixing models for dielectric logging" by Kouchmeshky et. al. (2016), which quantifies and compares the performance of mixing models for sandstone and carbonate rocks.

Regularization may employ information from a reservoir's rock database of multi-physics models and properties which may include data with respect to geology, mineralogy, petrophysical models, electrical (e.g., dielectric) properties, nuclear properties, acoustic properties, NMR and reservoir production properties, including for example, well logs from various FE tools. This data may be obtained from surface rock sample measurements, dowhole rock measurements, outcrop rock measurements, reservoir modeling and simulation, and reservoir production history.

Regularization techniques may include simultaneous inversion, regularization algorithms, and regularization by conditioning. Regularization algorithms may include zero norm:

$$\|\varepsilon_j\|=0;$$

$$\|\sigma_j\|=0.$$

Another method is to use a reference model, such as, for example, $$[\varepsilon_j^{(0)}; \sigma_j^{(0)}].$$

which could be obtained from inverting all frequencies assuming no dispersion in the previous level. Further methods employ smoothing constraints, such as, for example, $$\Delta\varepsilon_j=\varepsilon_1;$$

$$\Delta\sigma_j=\varepsilon_2.$$

A technique involves rock petrophysical model regularization by conditioning, using geologic data, mineralogic data, hydraulic properties, electric (e.g., dielectric) properties, and so on, and/or multi-instrument data. The data may be sequentially or simultaneously acquired and/or alternatively available in a searchable relational database with correlated and relevant data and analysis from the same reservoir (or a correlated reservoir). Data may be correlated by geologic and mineralogic relationships. Instead of designating a particular value for a parameter, a probability density function ('PDF') may be used to specify the probability of the parameter (e.g., a variable such as, for example, an observed measurement within a sample space) falling within a particular range of values or taking a value. The PDF may be derived from historical observation. The probability may be given by the integral of this variable's PDF over that range—that is, given by the area under the density function but above the horizontal axis and between the lowest and greatest values of the range. The PDF is non-negative everywhere, and its integral over the entire space may be equal to one. The PDF may be a function of reservoir type, geology, mineralogy, deposition mechanisms, reservoir location, and/or region (e.g., depth). The PDFs may be used to accelerate the regularized direct inversion without excluding potential inversion outcomes that would satisfy the forward models associated with rock characteristics and corresponding tool response.

The PDF may be assigned based on previous observations with respect to the choice or preference of petrophysical models, as well as value ranges for the models' respective parameters, as a function of reservoir depth, reservoir block region, and/or location, i.e. geology and mineralogy reservoir description responsible for the dielectric response characteristics. These PDFs may be used to assign inversion weights to inversion parameters. The PDFs may employed for prioritizing and guiding regularized direct inversion with weights on models and model parameter ranges reflecting most likely values for that particular reservoir. The PDFs may be tailored to a reservoir location or interval based on a database of previously characterized rocks from the reservoir or those previously acquired from correlated reservoirs, or acquired by the tool during a tool string logging operation (sequentially or concurrently acquired), such as, for example, acquired in the same trip. Inversion processing with a tool measurement and a corresponding forward model may similarly assign weights to the measurement signals being interpreted based on its signal-to-noise ratio. The better (higher) the signal to noise ratio, the higher the weight which may be assigned to the corresponding measurement data during inversion processing. Similarly the PDF could be combined with the regularized direct inversion to assign weights to the most likely models and corresponding parameter values for the reservoir being evaluated based on past observations correlated by location, mineralogy, geology, geostatistics, reservoir horizontal homogeneity and so on.

The PDF may be associated with reservoir depth, reservoir block region, and/or location as a function of stratigraphic layered sequences and layered rock type patterns. These associations may be derived from observed (i.e. logged) or otherwise known layers sequences and patterns. The data relating reservoir depth, reservoir block region, and/or location may be recorded, characterized, analyzed and stored in database. In some examples, the PDF may be a function of analysis of the data including patterns. Each reservoir may have a characteristic deposition dynamic event sequence that determines the reservoir's stratigraphic layer sequence. As one or more layers are identified and associated with certain petrophysical models and/or tool measurement responses, a PDF may be associated with the adjacent layers to fit known and established layer pattern sequences. Thus, a PDF may represent a corresponding petrophysical model, and corresponding parameter values for the model, for each one of the layers' sequence patterns.

Petrophysical regularization herein may employ simultaneous fitness rating for each layer or other structural unit. Each may be constrained to particular rock types as well. Inputs and outputs for various models may be forced to have common parameters. Cross-correlated constraints may be used. Multi-instrumentation for formation evaluation data inversion and conditioning may employ:

$$\varepsilon_j(\omega) = f_j(p, \omega);$$

$$\sigma_j(\omega) = g_j(p, \omega);$$

$$p = [\varphi_w, S_w, m, n, CEC, f \ldots]^T;$$

for j=1 ... N.

Figure 4D:
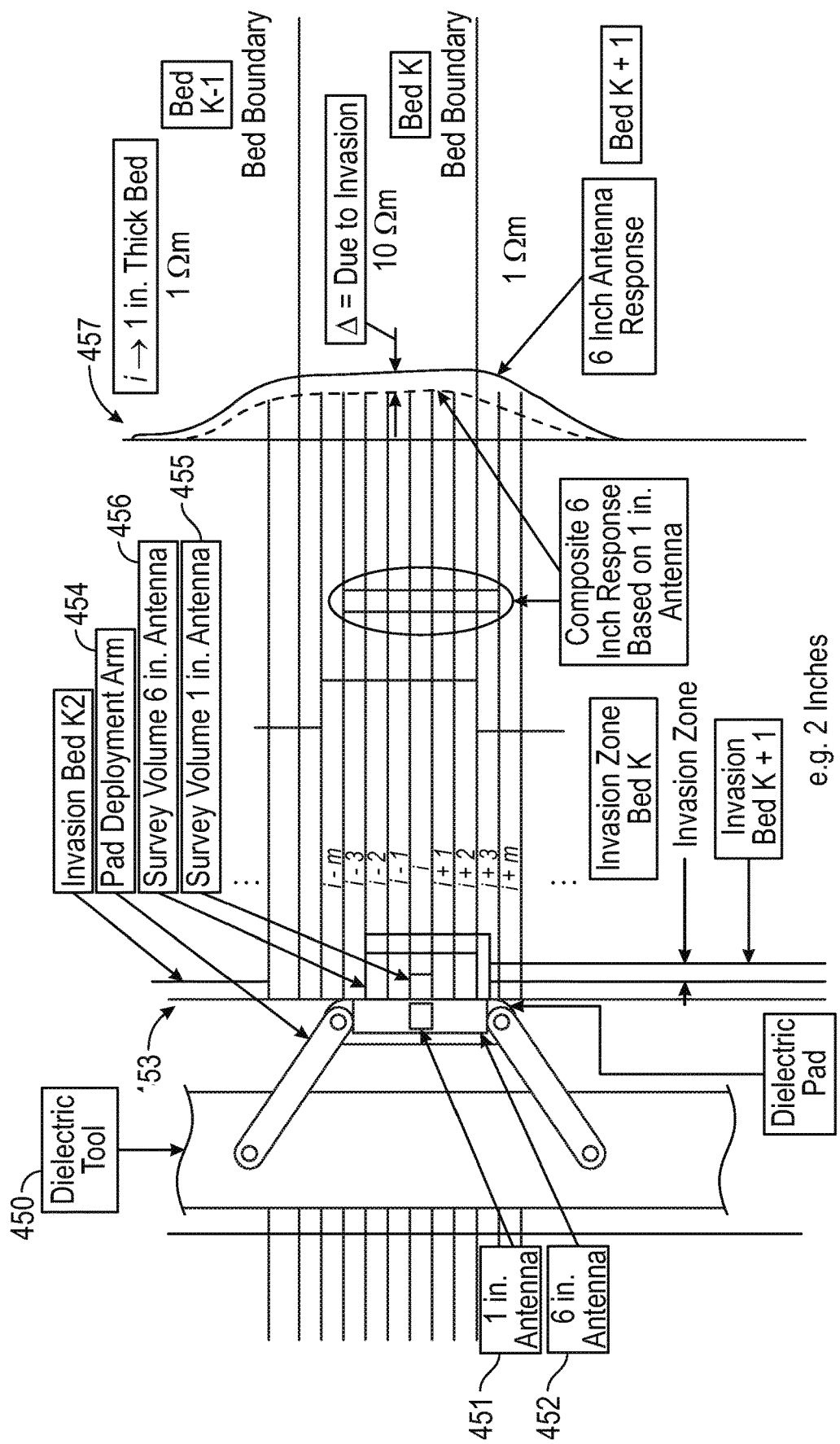
FIG. 4D illustrates techniques for physical regularization of inversions in accordance with embodiments of the present disclosure.
Figure 4D:
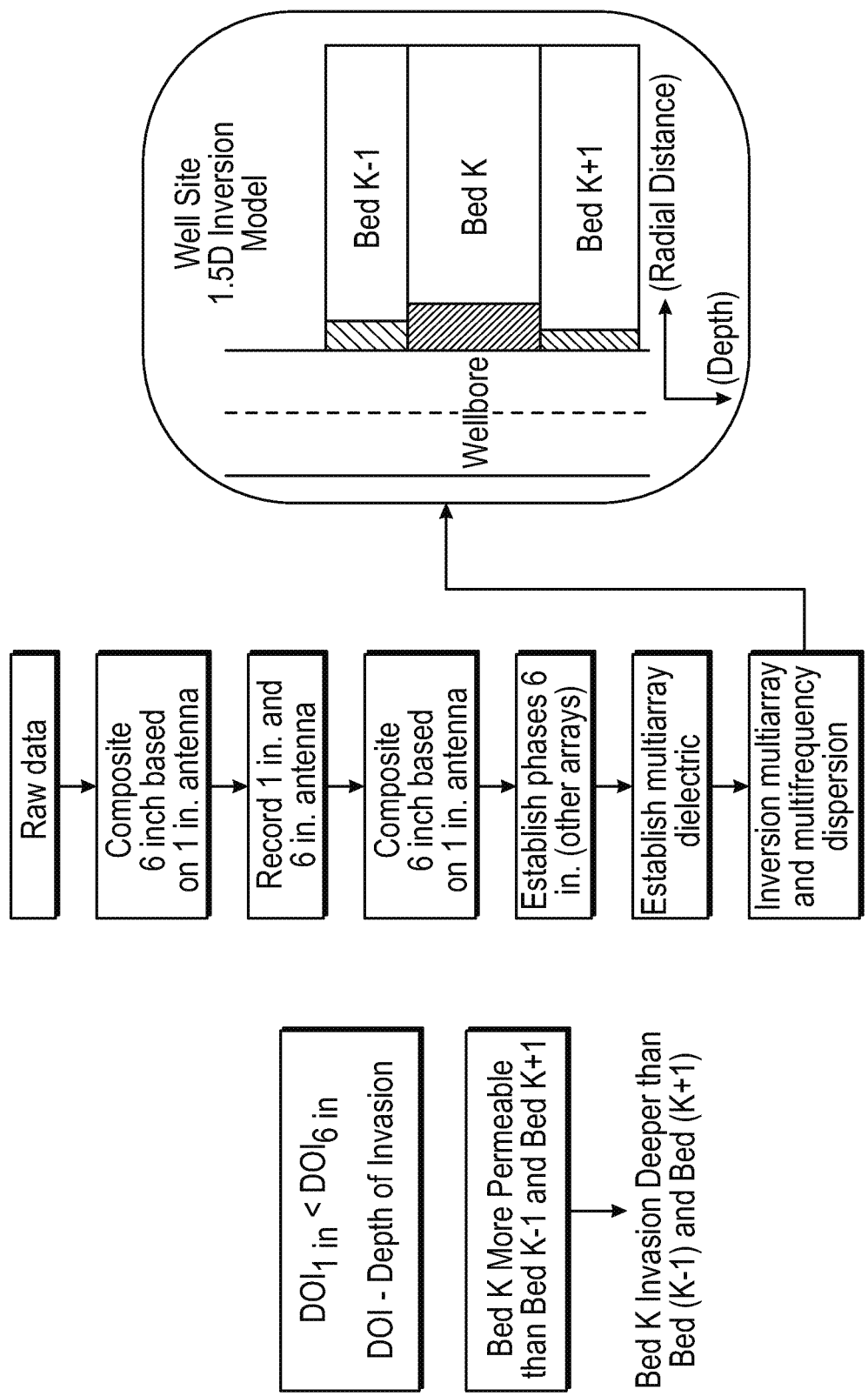

FIG. 4D illustrates techniques for physical regularization of inversions in accordance with embodiments of the present disclosure. FIG. 4D shows a model including a dielectric tool with a pad having a 1-inch antenna 451 and a 6-inch antenna 452 engaged with the borehole wall 453 by a pad deployment arm 454. Propagation measurements may be inverted to obtain petrophysical parameter values of the formation. Models may include a multitude of thin (e.g., 1-inch) layers of equal thickness categorized as having uniform petrophysical parameters throughout the layer. The depth of investigation (DOI), or radial depth as measured from a longitudinal axis of the tool at which the properties of the formation still influence the measurement, is greater for the larger antenna. Fluid invasion from the borehole creates invasion zones k, k+1, etc. The antennas 451, 452 have survey volumes 455, 456, respectively. The formation is represented as 1-inch thick horizontal beds along the length of the borehole.

Conductivity with respect to borehole depth is shown by graphic 457. The graphic illustrates the 6-inch antenna response in comparison with the composite 6-inch response based on the 1-inch antenna. The difference in conductivity between the 6-inch and composite response is due to invasion. Bed k is more permeable than bed k−1 and bed k+1, because the invasion in bed k is deeper than the other beds. Axial resolution enhancement, radial focusing, and background-based focusing may be applied in accordance with U.S. Pat. No. 6,049,209 to Xiao et al. and U.S. Pat. No. 6,219,619 to Xiao et al, both incorporated herein by reference in their entireties. Dimensions and other properties of bed k may be incorporated as constraints for the inversion.

For example, a petrophysical model and respective parameters may be used as a prior data to accelerate the inversion. These models may include model parameters represented as most likely values, relative likelihood ranges, and probability density functions. This data may be determined from related drilling activities, inferred from geological processes, and so on. Sequencing of rock layers may also be used to constrain the inversion, for example, by designating a rock type identified as the most likely rock to be nearby, or by using the most likely sequence of rock layers to regularize, stabilize, and optimize the inversion. As one example, a probability density function representing likelihoods of rock type sequencing may be used. In the inversion, all the layers may be solved for simultaneously.

Aspects include high resolution formation model discretization with thin rock layers' data interpretation of petrophysical models and corresponding parameters assisted and constrained by a priori structural layer data or joint interpretation techniques utilizing data acquired by high resolution logging instruments such as borehole wall image logs. See, for example, U.S. Pat. No. 6,591,194 to Yu et al, incorporated herein by reference. Inversion processing of data logged with sufficiently high spatial sampling density (e. g., greater than 24 samples per feet) may be carried out over intervals discretized with equal and thin axial layer thickness with interpreted formation property values (conductivity, dielectric constant, etc.) controlled by a forward model ('discretized formation model'). For example, axial synthetic resolution focusing methods may process 6-inch resolution synthetic logs with varying depth of investigations from higher resolution 1-inch resolution measurements with integration based methods, and conversely from 6-inch resolution measurements to 1-inch synthetically processed resolution logs utilizing data logged with sufficiently high spatial sampling density (e. g., greater than 24 samples per feet) optionally utilizing information from other higher resolution auxiliary log data and differentiation based methods. See U.S. Pat. No. 6,049,209 to Xiao et al. and U.S. Pat. No. 6,219,619 to Xiao et al.

Figure 5A:
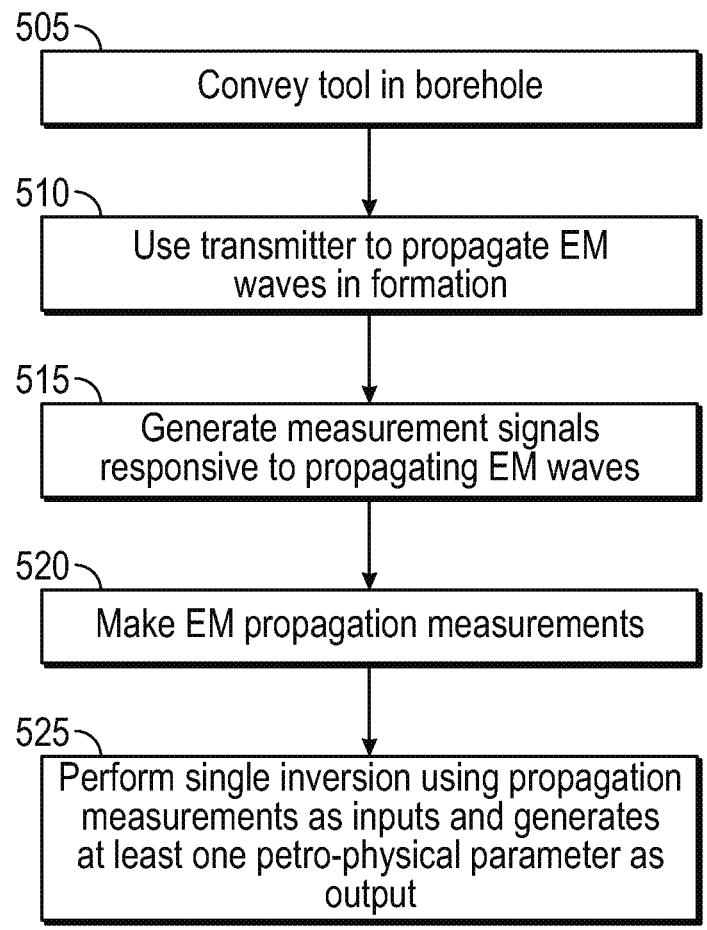
FIGS. 5A & 5B illustrate methods in accordance with embodiments of the present disclosure.
Figure 5B:
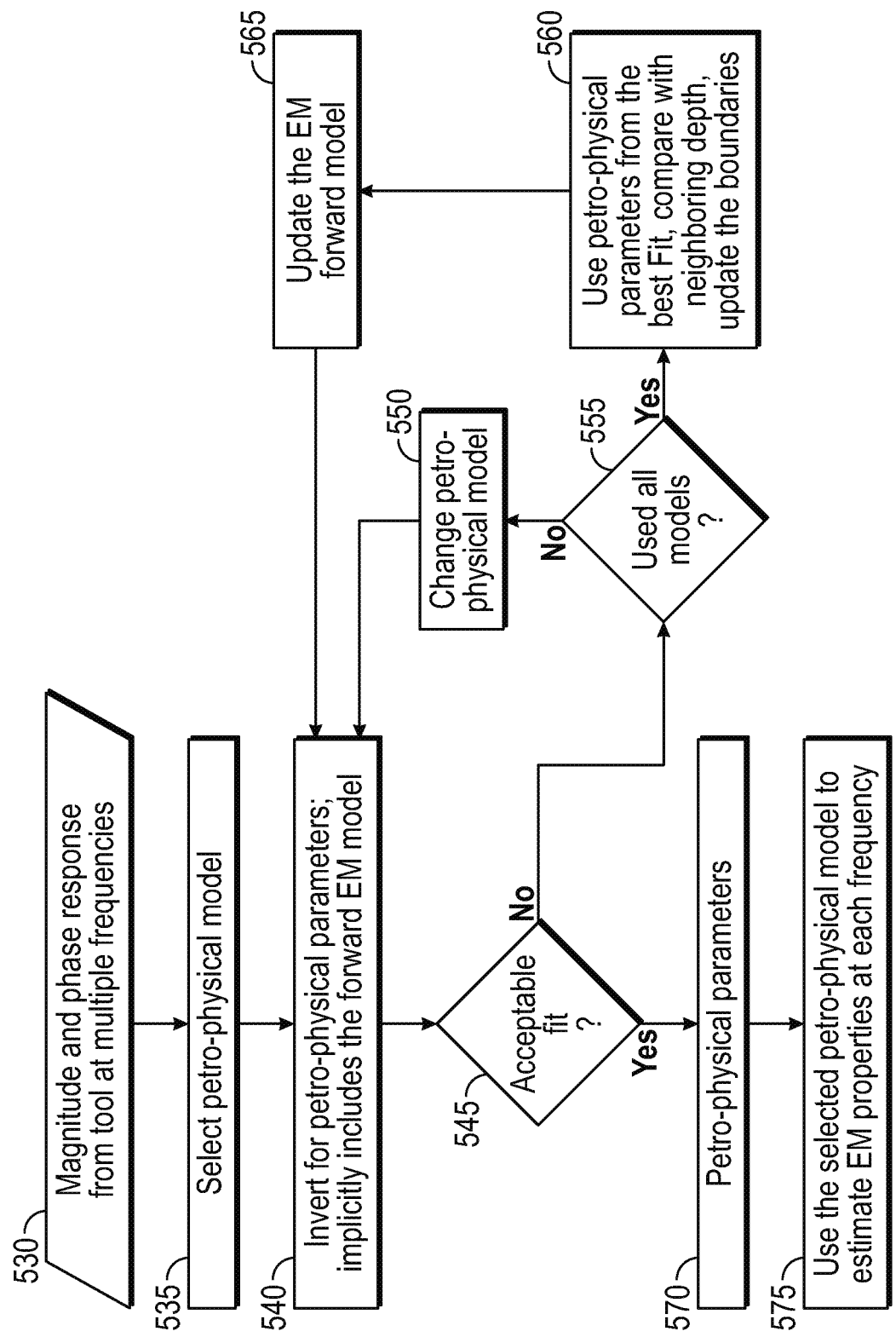

FIGS. 5A & 5B illustrate methods in accordance with embodiments of the present disclosure. FIG. 5A begins at step 505 by conveying a multi-frequency array dielectric tool in a borehole intersecting an earth formation. Step 510 comprises using at least one transmitter to generate a plurality of electromagnetic (EM) waves propagating through the formation, as described above. Step 515 comprises generating measurement signals at least one receiver responsive to the plurality of propagating EM waves. Step 520 comprises taking a plurality of propagation measurements from the measurement signals representative of the propagating EM waves. Each propagation measurement of the plurality may include one or both of i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves. Other propagation measurements may also be used.

Step 525 comprises performing a single inversion which uses the plurality of propagation measurements as input and generates at least one petrophysical parameter as output. Step 525 may be carried out by stabilizing the inversion with limited selections of petrophysical models and a range of model parameters for each petrophysical model. Likely model parameter values may be preliminarily estimated from a data base of petrophysical data related to the targeted reservoir of interest. Queried rock characterization data may be employed during the inversion involving petrophysical modes and respective parameters. Within a location and depth region a probability function of more or less likely petrophysical models may be employed with respective model parameters' probability function used to prioritize the inversion solution choice.

Estimated petrophysical parameters of interest may be stored (recorded) as information or visually depicted on a display. The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing boundary and formation information in a global coordinate system. The further processing may include estimation and planning of reservoir production and economic recovery. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

Method embodiments may include conducting further operations in the earth formation in dependence upon measurements, estimated parameters of interest (e.g., formation properties), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

FIG. 5B illustrates performing the single inversion. A magnitude and phase response from the tool at multiple frequencies is received as input to the inversion (530). A petro-physical model is selected (535). The selection of the model may be made in dependence upon the tool response. At step 540, an inversion is performed for the petrophysical parameters, as described above. At step 545, the results are checked for fit. If the fit is unacceptable, the model is changed 550 as long as the available models have not been exhausted (555). If all models have been used, petrophysical parameters from the best fit are compared with neighboring depths (560), and the EM forward model may be updated (565) before beginning another iteration starting at step 540. Upon an acceptable fit being determined, the petrophysical parameters are produced as output (570). The selected petro-physical model may then be used to estimate EM properties at each tool frequency (575).

FIGS. 6A-6D show simulated propagation measurement results illustrating the diminished effects of noise on evaluation using methods in accordance with embodiments of the present disclosure. In this example synthetic data representing a noisy tool response in a formation with known petrophysical properties is used to demonstrate the improvement in performance of the inversion methods of the present disclosure. The petro-physical parameters obtained from the application of conventional inversion methods and the techniques of the disclosure are each compared with the actual petro-physical models used to generate the tool response to compare the noise tolerance of each method.

Figure 6A:
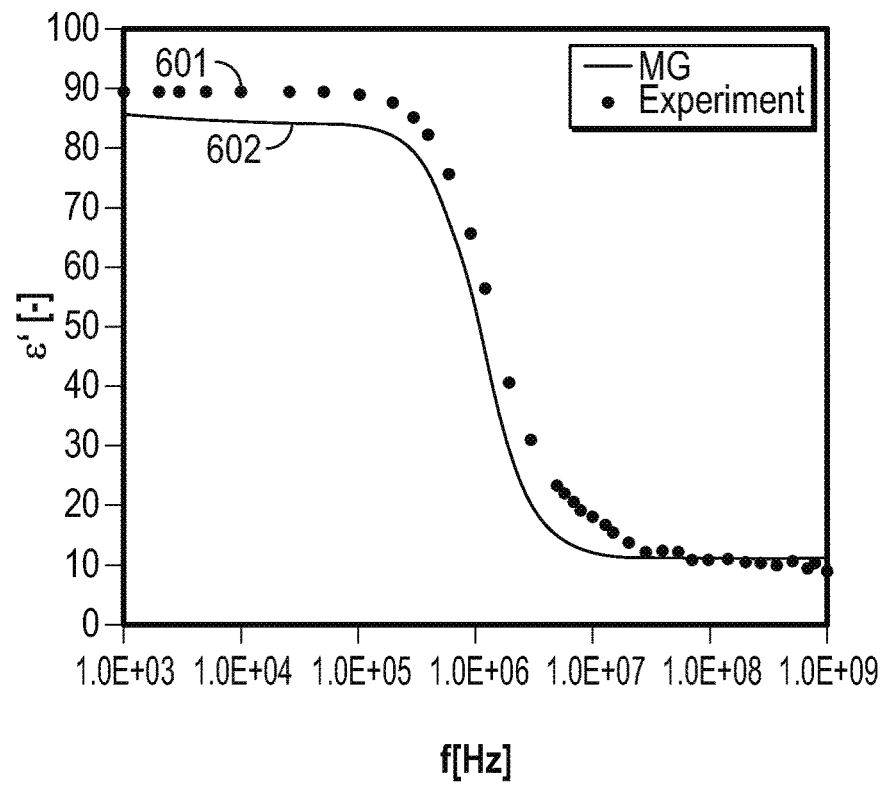
FIGS. 6A-6D show simulated propagation measurement results illustrating the diminished effects of noise on evaluation using methods in accordance with embodiments of the present disclosure.
Figure 6B:
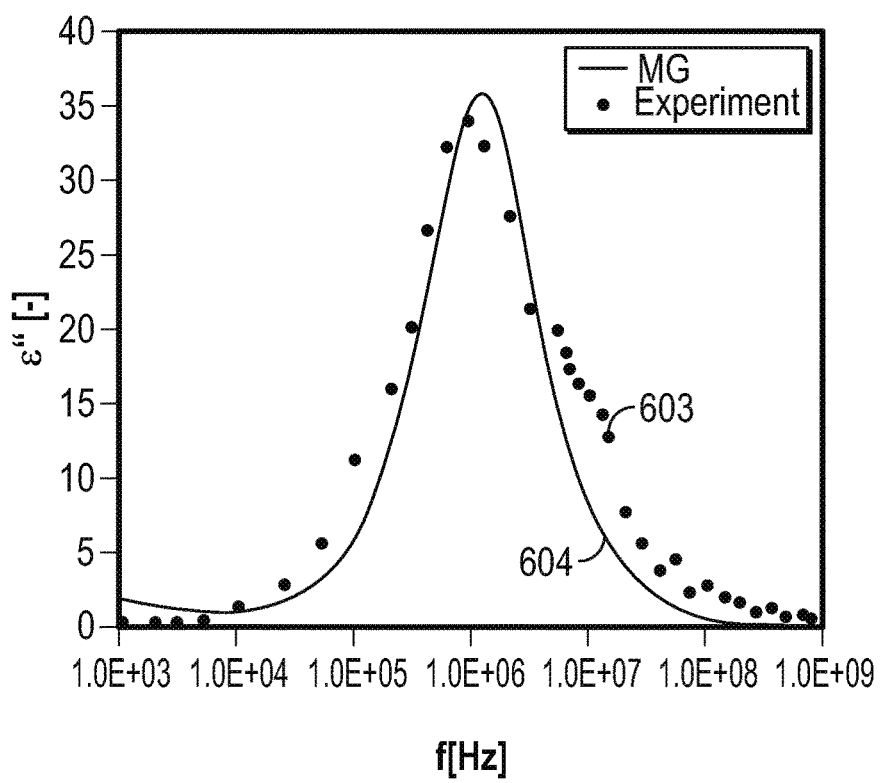

FIGS. 6A & 6B show experimental measured dispersive permittivity and fitted Maxwell-Garnett (MG) mixing model for a sandstone core. FIG. 6A compares a curve 602 representing the real part of permittivity with respect to frequency estimated using the techniques of the present disclosure and experimentally measured results 601 of the real part of permittivity with respect to frequency. Experimental data on a rock core is used. The core's porosity is 19 percent and it is fully saturated with water. FIG. 6B compares a curve 604 representing the imaginary part of permittivity with respect to frequency estimated using the techniques of the present disclosure and experimentally measured results 603 of the real part of permittivity with respect to frequency.

Kouchmeshky et. al. 2016, a study on this core data, has shown that Maxwell-Garnett can be used as a mixing model that provides a good fit to the dispersive real and imaginary part of permittivity (or permittivity and conductivity) as well as an accurate estimation of water saturation and water resistivity at DC. This mixing model is selected for the inversion in each case. Next, the transmitters and receivers of the dielectric tool are simplified as perfect magnetic dipoles in a homogenous space with aforementioned electromagnetic properties. The dispersive electromagnetic properties of the formation are assumed to follow the results obtained from the core data. Using these assumptions the tool response can be obtained from the following relation $$\frac{B_{r_2}}{B_{r_1}} = \left(\frac{r_1}{r_2}\right)^3 \frac{kr_2 + i}{kr_1 + i} e^{ik(r_2 - r_1)} \quad (11)$$

where transmitter and receivers are represented by points in space, $k = \omega(\mu\tilde{\varepsilon})^{0.5}$ is the complex wave number with $\omega$ as angular frequency and $\mu$ and $\tilde{\varepsilon}$ as magnetic permeability and complex permittivity respectively, $r_m$ is the magnitude of the vector $r_m$ connecting transmitter and receiver m, and $Br_m$ is the component of magnetic field along vector $r_m$ at receiver m. It is assumed that all transmitter and receivers can be represented by collinear points and that magnetic moments of transmitter and receivers are all parallel to the direction of vector connecting the transmitter and receivers, $r_m$.

Referring to FIGS. 6A & 6B, the response of the tool at different frequencies from 20 MHz to 1 GHz are obtained from previous equation and subjected to noise as shown below.

$$\mathrm{mag}^*_{\omega_i} = \mathrm{mag}_{\omega_i} \times (1 + u_i) \quad (12)$$

$$\mathrm{phase}^*_{\omega_i} = \mathrm{phase}_{\omega_i} \times (1 + v_i) \quad (13)$$

where $\mathrm{mag}_{\omega_i}$ and $\mathrm{phase}_{\omega_i}$ are respectively the relative magnitude and relative phase of the tool at frequency $\omega_i$, while $\mathrm{mag}_{\omega_i}^*$ and $\mathrm{phase}_{\omega_i}^*$ are the tool response perturbed by the noise. $u_i$ and $v_i$ are independent random variables representing the error associated with recording the tool response and follow a Gaussian distribution $N(\mu,\sigma)$ where $\mu=0$ and $\sigma=0.05$. There are in total 2×N independent random variables representing the noise $E=[u_1, v_1, u_2, v_2, \ldots, u_n, v_n]$.

Monte-Carlo simulation was used to study the effect of noise on the inverted petro-physical parameters using two inversion methods (the first method is the traditional two-step inversion method used for dielectric logging and the second method is the proposed method which is a one-step inversion method regularized by petrophysical models). For the simulation, 10000 realizations of the vector E were used. For each realization the perturbed tool response is calculated and used to obtain the inverted petro-physical parameters Rw and Sw representing water conductivity and water saturation respectively.

Figure 6C:
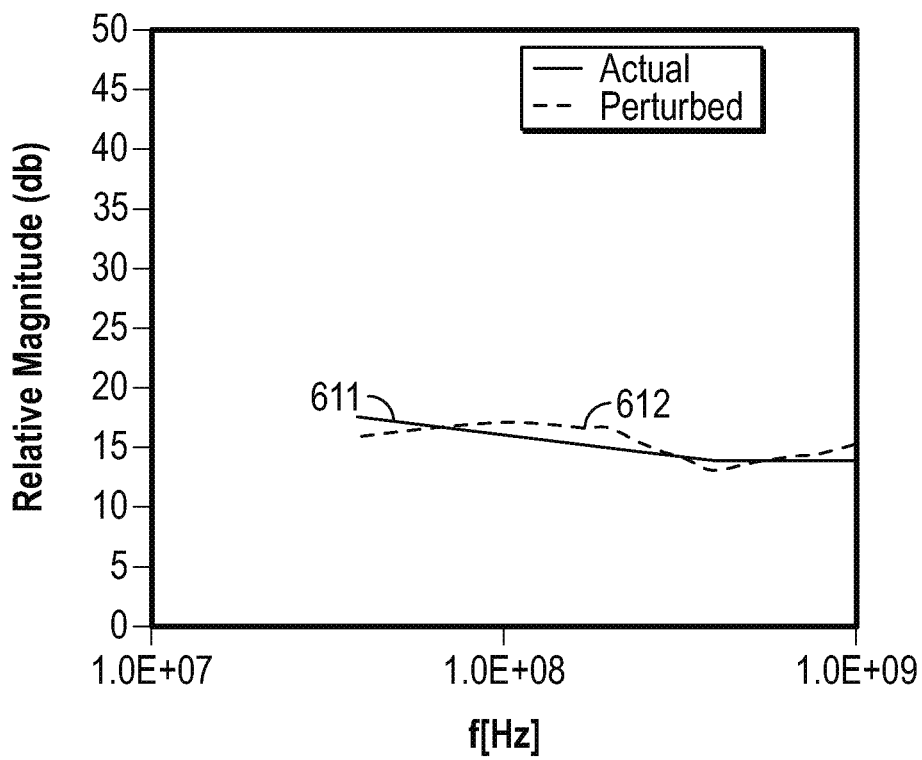
Figure 6D:
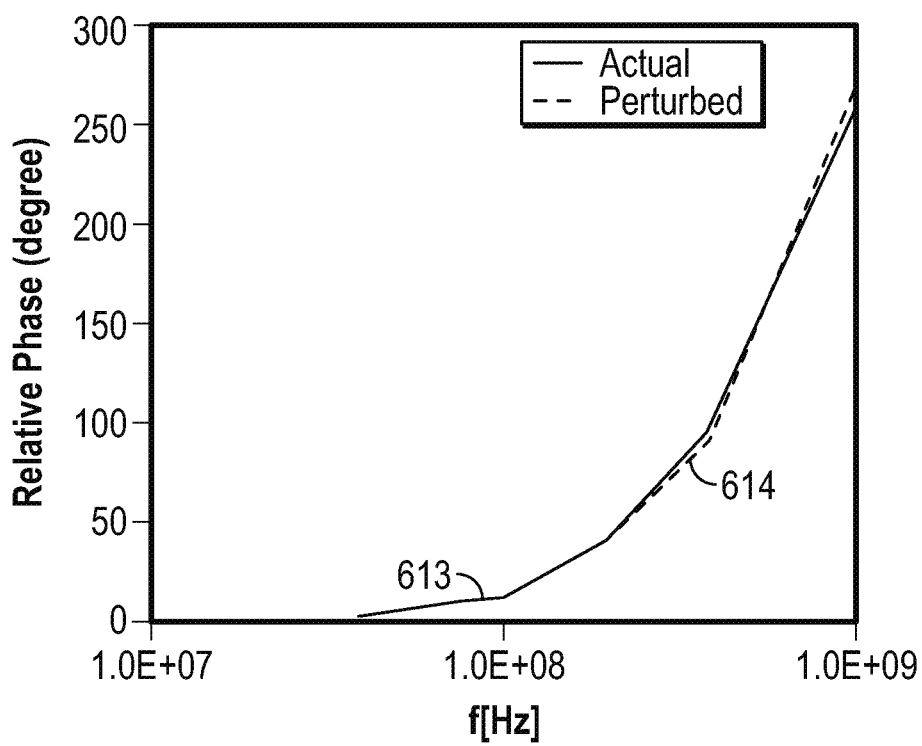

FIGS. 6C & 6D show simulated propagation measurement results illustrating a realization of random noise introduced to the signal. FIG. 6C shows relative magnitude in dB with respect to frequency for actual 611 and perturbed 612 signals. FIG. 6D shows relative phase in degrees with respect to frequency for actual 613 and perturbed signals 614. As observable from the figures, the elements of the random vector representing noise are independent from each other.

Figure 7A:
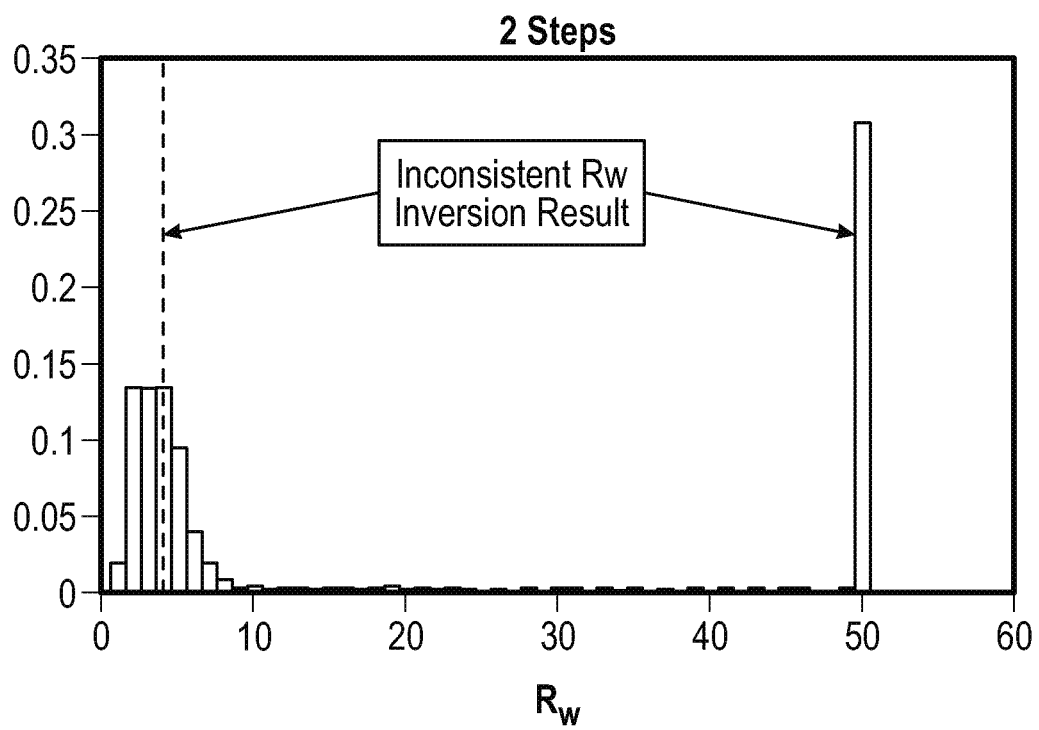
FIGS. 7A & 7B show simulated results illustrating the probability distribution of petrophysical parameters obtained from conventional techniques (two-step methods).
Figure 7B:
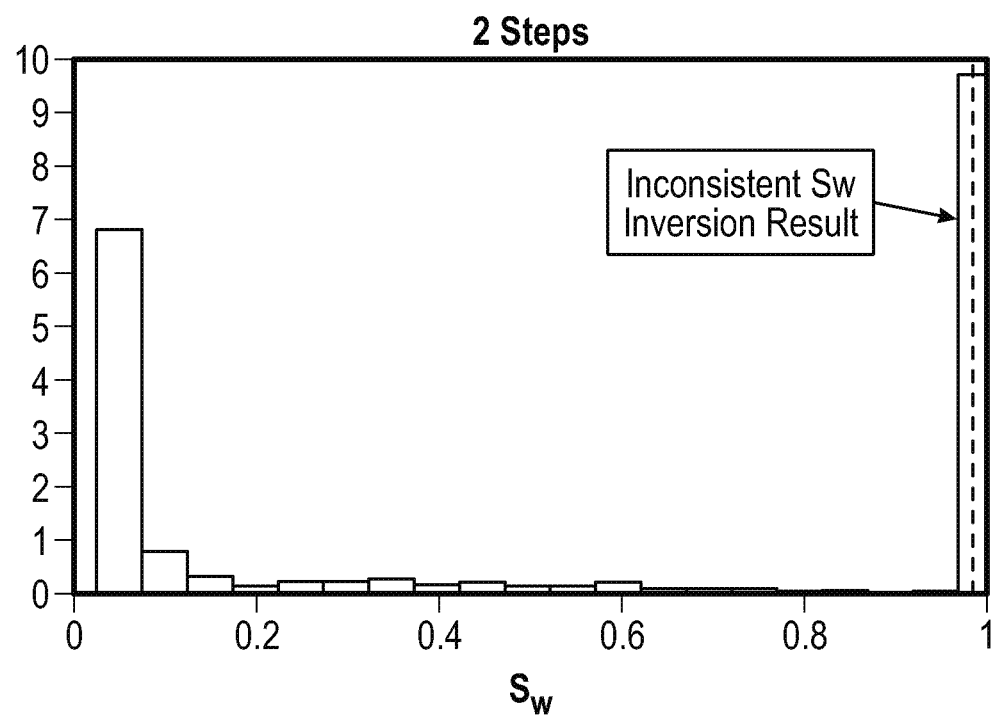
Figure 7C:
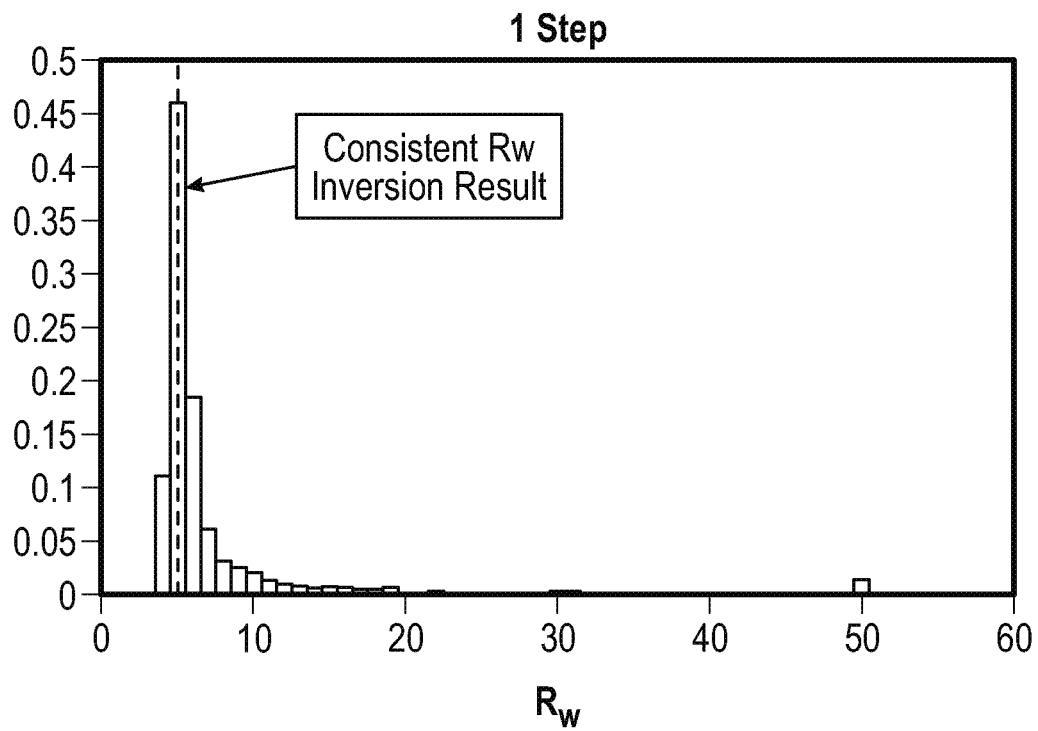
FIGS. 7C & 7D show simulated results illustrating the probability distribution of petrophysical parameters obtained from techniques of the present disclosure.
Figure 7D:
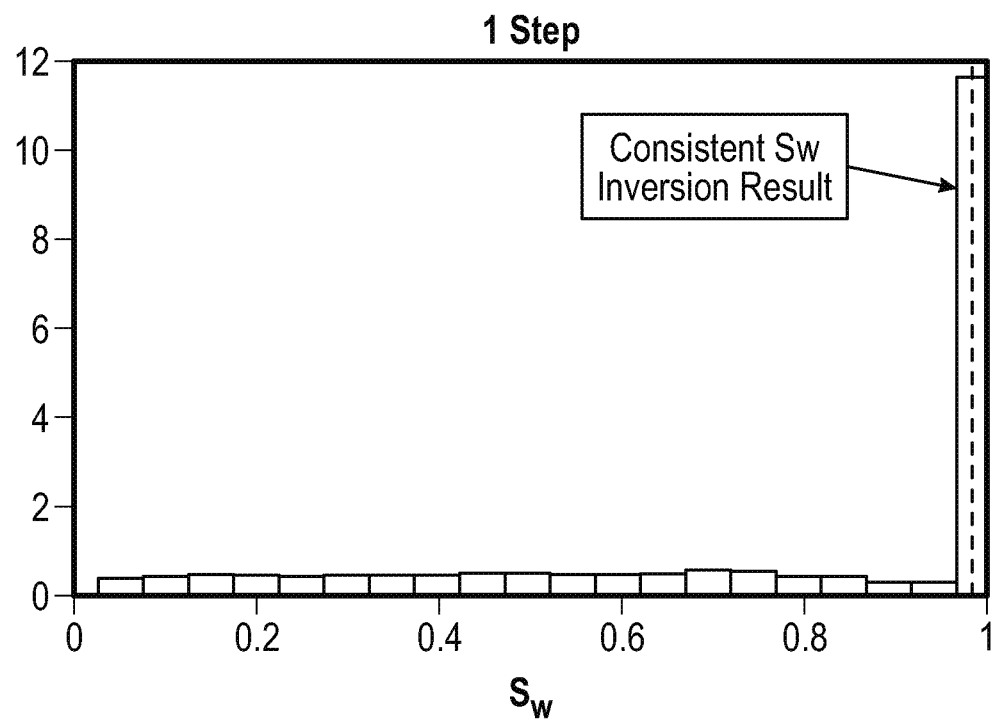

FIGS. 7A & 7B show simulated results illustrating the probability distribution of petrophysical parameters obtained from conventional techniques (two-step methods). FIG. 7A shows the probability distribution of inverted resistivity of formation water. FIG. 7B shows the probability distribution of water saturation. The dashed line shows the actual parameter value. It is apparent that inversion results are inconsistent. As can be seen in the case of inverted water resistivity Rw, the highest probability corresponds to a value that is far from the actual water resistivity. FIGS. 7C & 7D show simulated results illustrating the probability distribution of petrophysical parameters obtained from techniques of the present disclosure. It is apparent that inversion results are consistent.

Figure 8:
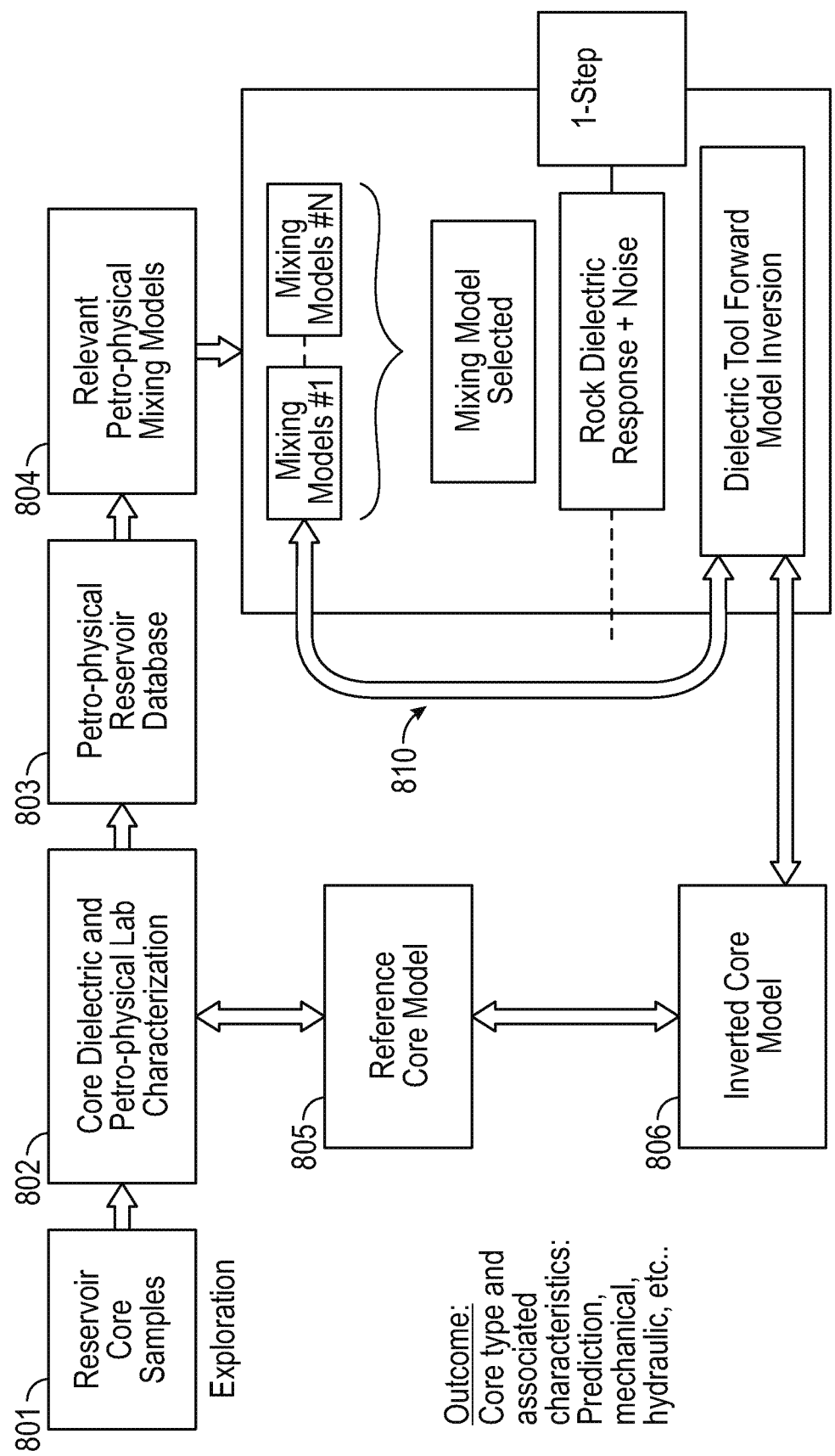
FIG. 8 illustrates a process flow in accordance with embodiments of the present disclosure.

FIG. 8 illustrates a process flow in accordance with embodiments of the present disclosure. At step 801, core samples related to a reservoir may be taken from an earth formation. Core dielectric and petrophysical lab characterization may be carried out at step 802. A database 803 comprising a petrophysical models library & regularized dielectric inversion & rock typing information may be employed to generate mixing models 804 as described above. The database may include the results of characterization 802, including dielectric properties, reservoir engineering and production parameters, and the like, as would occur to those of the skill in the art. More particularly, the database may include a reservoir library database with inversion ready petrophysical models, geological, mineralogy, electrical and reservoir properties and may be populated by rock samples analysis from surface and downhole measurements. Further regularization may be carried out by assigning rock typing to identified formation beds (e.g., volumetric layers). The inversion may include joint interpretation with other formation evaluation (FE) instruments using the rock typing database. Inversion as described above is carried out at step 810, which produces an inverted core model 806 which may be compared to reference core model 805, and analysis of the comparison may result in modification of the model used in following iterations.

Other, optional, steps may include evaluating the formation or modeling the formation using the parameters of interest, conducting secondary recovery operations in dependence upon the estimated parameters, the model, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Implicit in the processing of data is the use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof. In several non-limiting aspects of the disclosure, an information processing device includes a computer that executes programmed instructions for performing various methods. Herein, the term "information" may include one or more of: raw data, processed data, and signals.

A location refers to a borehole depth within a single borehole. Transmitting from a single location in the formation refers to a condition wherein a location of a first signal transmission is substantially different than a location of a second signal transmission. Transmissions may be from the same or different transmitters and made simultaneously, sequentially, intermittently, irregularly, etc. "Substantially different" as used herein means not substantially the same. "Substantially the same," or "substantially similar" as used herein means from a position, with all other variables unchanged, producing a value within a common statistical deviation, such as within one standard deviation, within 5 percent, within 1 percent of a moving average and so on. Substantially the same refers to values within the generally held value for common deviation, such as, for example, due to noise. Collocated, as used herein, refers to antennas placed at substantially the same axial location.

As described herein, "complex permittivity" refers to a permittivity having a real part, which is commonly called the dielectric constant, and an imaginary part, which is commonly called the dielectric loss factor or loss tangent. As described herein, the terms "cementation exponent" and "saturation exponent" refer to parameters of Archie's law including the exponent m and the exponent n, respectively.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation. Forward modeling, as used herein, refers to the technique of determining what a given sensor would measure in a given formation and environment by applying a set of theoretical equations for the sensor response.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used. The term "ground truth" as used herein refers to information from previous measurement or knowledge.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

Appendix

Various mixing models may be used, including for example, a commonly employed mixing model, Complex Refractive Index Model (CRIM). U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency.

Although applicability of CRIM for all formation types is not certain, it is widely used in formation evaluation due to its simplicity. Analytically, this model corresponds to fixed values for Archie's parameters (m=n=2). Velocity of electromagnetic wave is proportional to inverse square root of permittivity. A plane wave solution will have the form $$V = Ce^{ikx}$$

where
V=a field variable;
C=a constant
e=the naperian log base
i=the square root of −1;
x=the distance traveled; and $$k = [(\omega^2 \mu_o \mu_r \varepsilon_o \varepsilon_r) + (i \omega \mu_o \mu_r \sigma)]^{1/2}$$

where:
c=the speed of light=2.999 $10^8$ (meters/second);
$\mu_o$=the magnetic permeability of free space=$4\pi \times 10^{-7}$ [N/A$^2$];
$\mu_r$=the relative permeability (which is 1.0 for free space and most earth materials);
$\varepsilon_o$=the electric permittivity of free space=$1/(\mu_o C^2)$=$8.854 \times 10^{-12}$ [F/m];
$\varepsilon_r$=the relative dielectric constant (which is 1.0 in free space);
$\omega$=the angular frequency of the applied field; and
$\sigma$=the conductivity.

The term k can be rewritten in terms of a relative complex dielectric constant, $$\tilde{\varepsilon}_r = \varepsilon_r + i\sigma(1/\omega\varepsilon_o).$$

The CRIM model is a simple model that obtains the effective permittivity of a mixture based on the weighted average of its constituents. It simplifies the mixture as a layered composite with each layer having properties that correspond to a phase in the mixture and a thickness that is proportional to the volume fraction of each phase. The speed of electromagnetic wave in a material is related to the speed in vacuum through $$\frac{c}{c_0} = (\Gamma_r \tilde{\epsilon}_r)^{-0.5}$$

where c is the speed of electromagnetic wave in material, $c_0$ the speed of electromagnetic wave in vacuum, $\Gamma_r$ is the relative permeability and $\tilde{\epsilon}_r$ is the complex relative permittivity. The total travel time for the electromagnetic wave is seen as the sum of the time it takes for the wave to travel in each layer (phase). Using this hypothesis and assuming the relative permeability to be the same for all phases result in $$\tilde{\epsilon}_{\mathit{eff}}^{0.5} = \sum_{i=1}^{N} f_i \tilde{\epsilon}_i^{0.5} \qquad (30)$$

where $\tilde{\epsilon}_i$ is dielectric property for each phase present in the mixture and $f_i$ is volume fraction of each phase. In case of a mixture of solid matrix (m), water (w) and hydrocarbon (h) the equation becomes $$\tilde{\epsilon}_{\mathit{eff}}^{0.5} = (1-\varphi)\tilde{\epsilon}_m^{0.5} + \varphi S_W \tilde{\epsilon}_w^{0.5} + \varphi(1-S_W)\tilde{\epsilon}_h^{0.5} \qquad (31).$$

What is claimed is:

1. A method of evaluating an earth formation intersected by a borehole, the method comprising:
   generating multi-frequency array dielectric signal data by:
      using at least one transmitter to generate a plurality of electromagnetic (EM) waves propagating through the formation at a plurality of frequencies;
      generating measurement signals at at least one receiver responsive to the plurality of propagating EM waves; and
      taking a plurality of propagation measurements from the measurement signals representative of the propagating EM waves, where each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves;
   performing a single inversion which uses the plurality of propagation measurements as input and generates at least one petrophysical parameter as output by:
      iteratively using each of a plurality of petrophysical models comprising a set of corresponding petrophysical parameter values to simulate predicted propagation measurements at the plurality of frequencies, wherein the plurality of petrophysical models comprises at least one petrophysical mixing model relating dielectric behavior of a mixture to properties of constituents of the mixture;
      comparing the predicted propagation measurements against the propagation measurements to calculate a distance metric for each frequency of the plurality of frequencies for each petrophysical model of the plurality of petrophysical models;
      determining a best fit petrophysical model of the plurality of petrophysical models from the distance metric for each frequency of the plurality of frequencies for each petrophysical model of the plurality of petrophysical models; and
      estimating a value for the at least one petrophysical parameter from the best fit petrophysical model;
   performing at least one of: i) storing the value for the at least one petrophysical parameter; and ii) rendering the value for the at least one petrophysical parameter on a display; and
   conducting further operations in the earth formation in dependence upon the estimated value of the at least one petrophysical parameter, the further operations comprising at least one of: i) geosteering; ii) drilling additional boreholes in the formation; iii) installing equipment in the borehole; iv) drilling the borehole; and v) producing one or more hydrocarbons from the formation;
   wherein the at least one petrophysical parameter comprises at least one of: resistivity of connate water ($R_W$), cation-exchange capacity (CEC); water saturation of the formation ($S_W$), water-filled porosity ($\varphi_W$), water conductivity of the formation at DC ($\sigma_W$), porosity ($\varphi$), cementation exponent (m), and saturation exponent (n).

2. The method of claim 1 wherein the inversion is performed on the at least one petrophysical parameter and the plurality of propagation measurements simultaneously.

3. The method of claim 1, comprising:
   selecting the at least one petrophysical mixing model as the petrophysical model for the inversion;
   regularizing the inversion.

4. The method of claim 3 wherein regularizing the inversion comprises incorporating a priori data into the inversion, the a priori data comprising information about probable values of parameters in the at least one petrophysical mixing model.

5. The method of claim 4 wherein the a priori data comprises a probability distribution function representing the probable values of the parameters of the at least one petrophysical mixing model.

6. The method of claim 4 wherein the a priori data comprises a probability distribution function representing the probable values of the formation properties.

7. The method of claim 3 wherein regularizing the inversion comprises incorporating a priori data into the inversion, the a priori data comprising information about probable values of formation properties constraining the inversion.

8. The method of claim 3 comprising selecting the at least one petrophysical mixing model in dependence upon at least one estimated lithology of the formation.

9. The method of claim 1 comprising representing predicted EM properties of the formation as a dispersive relation for calculated permittivity values and conductivity values of the formation.

10. The method of claim 9 comprising using the EM properties to simulate tool responses using a forward model to generate predicted responses.

11. The method of claim 10 comprising, in response to determining the predicted responses are not substantially similar to the plurality of propagation measurements, modifying at least one of: i) the at least one petrophysical mixing model; and ii) the forward model.

12. The method of claim 1 comprising generating an electrical property of the formation as output.

13. The method of claim 1 wherein the electrical property comprises at least one of: i) a frequency dependent conductivity parameter; and ii) a frequency dependent permittivity parameter.

14. The method of claim 1 comprising estimating a solution space for the at least one petrophysical parameter.

15. The method of claim 1 wherein performing the single inversion comprises using a discretized formation model as a forward model.

16. The method of claim 1 wherein performing the single inversion comprises including at least one petrophysically based regularization model in the inversion.

17. An apparatus for evaluating an earth formation intersected by a borehole, the apparatus comprising:
at least one processor; and
a computer memory accessible to the at least one processor comprising a computer-readable medium having instructions thereon that, when executed, causes the at least one processor to perform a method, the method comprising:
generating multi-frequency array dielectric signal data by:
using at least one transmitter to generate a plurality of electromagnetic (EM) waves propagating through the formation at a plurality of frequencies;
generating measurement signals at at least one receiver responsive to the plurality of propagating EM waves; and
taking a plurality of propagation measurements from the measurement signals representative of the propagating EM waves, where each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves;
performing a single inversion which uses the plurality of propagation measurements as input and generates at least one petrophysical parameter as output by:
iteratively using each of a plurality of petrophysical models comprising a set of corresponding petrophysical parameter values to simulate predicted propagation measurements at the plurality of frequencies, wherein the plurality of petrophysical models comprises at least one petrophysical mixing model relating dielectric behavior of a mixture to properties of constituents of the mixture;
comparing the predicted propagation measurements against the propagation measurements to calculate a distance metric for each frequency of the plurality of frequencies for each petrophysical model of the plurality of petrophysical models;
determining a best fit petrophysical model of the plurality of petrophysical models from the distance metric for each frequency of the plurality of frequencies for each petrophysical model of the plurality of petrophysical models; and
estimating a value for the at least one petrophysical parameter from the best fit petrophysical model;

performing at least one of: i) storing the value for the at least one petrophysical parameter; and ii) rendering the value for the at least one petrophysical parameter on a display; and
conducting further operations in the earth formation in dependence upon the estimated value of the at least one petrophysical parameter, the further operations comprising at least one of: i) geosteering; ii) drilling additional boreholes in the formation; iii) installing equipment in the borehole; iv) drilling the borehole; and v) producing one or more hydrocarbons from the formation;
wherein the at least one petrophysical parameter comprises at least one of: resistivity of connate water ($R_W$), cation-exchange capacity (CEC); water saturation of the formation ($S_W$), water-filled porosity ($\varphi_W$), water conductivity of the formation at DC ($\sigma_W$), porosity ($\varphi$), cementation exponent (m), and saturation exponent (n).

18. A method of evaluating an earth formation intersected by a borehole, the method comprising:
generating multi-frequency array dielectric signal data by:
using at least one transmitter to generate a plurality of electromagnetic (EM) waves propagating through the formation at a plurality of frequencies;
generating measurement signals at at least one receiver responsive to the plurality of propagating EM waves; and
taking a plurality of propagation measurements from the measurement signals representative of the propagating EM waves, where each propagation measurement of the plurality comprises at least one of: i) a relative phase shift between a first wave of the plurality of propagating EM waves and a second wave of the plurality of propagating EM waves; and ii) a relative attenuation between a first wave of the plurality of propagating EM waves and a second wave of the plurality of propagating EM waves;
performing a single inversion which uses the plurality of propagation measurements as input and generates at least one petrophysical parameter as output by:
iteratively using each of a plurality of petrophysical models comprising a set of corresponding petrophysical parameter values to simulate predicted propagation measurements at the plurality of frequencies;
comparing the predicted propagation measurements against the propagation measurements to calculate a distance metric for each frequency of the plurality of frequencies for each petrophysical model of the plurality of petrophysical models;
determining a best fit petrophysical model of the plurality of petrophysical models from the distance metric for each frequency of the plurality of frequencies for each petrophysical model of the plurality of petrophysical models; and
estimating a value for the at least one petrophysical parameter from the best fit petrophysical model; and
conducting further operations in the earth formation in dependence upon the estimated value of the at least one petrophysical parameter, the further operations comprising at least one of: i) geosteering; ii) drilling additional boreholes in the formation; iii) installing equipment in the borehole; iv) drilling the borehole; and v) producing one or more hydrocarbons from the formation;
wherein the at least one petrophysical parameter comprises at least one of: resistivity of connate water (Rw), cation-exchange capacity (CEC); water saturation of the formation (Sw), water-filled porosity ($\varphi w$), water conductivity of the formation at DC ($\sigma w$), porosity ($\varphi$), cementation exponent (m), and saturation exponent (n).

\* \* \* \* \*